US010011669B2

(12) United States Patent
Sugano et al.

(10) Patent No.: US 10,011,669 B2
(45) Date of Patent: Jul. 3, 2018

(54) METHOD FOR PRODUCING PROPYLENE BLOCK COPOLYMER

(71) Applicant: TOHO TITANIUM CO., LTD., Chigasaki-shi (JP)

(72) Inventors: Toshihiko Sugano, Chigasaki (JP); Motoki Hosaka, Chigasaki (JP); Toshiya Uozumi, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 14/770,974

(22) PCT Filed: Feb. 5, 2014

(86) PCT No.: PCT/JP2014/052624
§ 371 (c)(1),
(2) Date: Aug. 27, 2015

(87) PCT Pub. No.: WO2014/132759
PCT Pub. Date: Sep. 4, 2014

(65) Prior Publication Data
US 2016/0009836 A1    Jan. 14, 2016

(30) Foreign Application Priority Data

Feb. 27, 2013 (JP) .................. 2013-037835

(51) Int. Cl.
*C08F 210/06* (2006.01)
*C08F 297/08* (2006.01)

(52) U.S. Cl.
CPC .......... *C08F 210/06* (2013.01); *C08F 297/08* (2013.01)

(58) Field of Classification Search
None
See application file for complete search history.

(56) References Cited

U.S. PATENT DOCUMENTS

| 4,952,649 A | 8/1990 | Kioka et al. |
| 5,227,438 A | 7/1993 | Rebhan |
| 5,840,808 A * | 11/1998 | Sugimura ............. C08F 297/08 525/268 |
| 2014/0221583 A1 | 8/2014 | Uozumi et al. |
| 2014/0343237 A1 | 11/2014 | Sugano et al. |
| 2015/0166693 A1 | 6/2015 | Hosaka et al. |
| 2015/0240001 A1 | 8/2015 | Hosaka et al. |
| 2015/0240002 A1 | 8/2015 | Hosaka et al. |
| 2015/0240003 A1 | 8/2015 | Hosaka et al. |
| 2015/0240011 A1 | 8/2015 | Hosaka et al. |

FOREIGN PATENT DOCUMENTS

| CN | 1149879 A | 5/1997 |
| EP | 2 876 118 A1 | 5/2015 |
| EP | 2 902 418 A1 | 8/2015 |
| JP | 58 83006 | 5/1983 |
| JP | 06-100639 | * 4/1994 |
| JP | 6 100639 | 4/1994 |
| JP | 6 228223 | 8/1994 |
| JP | 8 3215 | 1/1996 |
| JP | 8 67710 | 3/1996 |
| JP | 9 87329 | 3/1997 |
| JP | 2003 34664 | 2/2003 |
| JP | 2004 315742 | 11/2004 |
| JP | 2005 48045 | 2/2005 |
| JP | 2012 214556 | 11/2012 |
| JP | 2014 37521 | 2/2014 |
| WO | WO 2004/055065 | 7/2004 |
| WO | WO 2011/068770 | 6/2011 |
| WO | 2012 060361 | 5/2012 |
| WO | 2013 042400 | 3/2013 |
| WO | 2014 013916 | 1/2014 |

OTHER PUBLICATIONS

Computer Translation of JP 06-100639 (1994).*
International Search Report dated Mar. 18, 2014 in PCT/JP14/052624 Filed Feb. 5, 2014.
U.S. Appl. No. 14/770,974, filed Aug. 27, 2015, Sugano, et al.
U.S. Appl. No. 14/427,204, filed Mar. 10, 2015, Hosaka, et al.
U.S. Appl. No. 14/344,431, filed Mar. 12, 2014, Sugano, et al.
U.S. Appl. No. 14/131,052, filed Apr. 9, 2014, Uozumi, et al.
U.S. Appl. No. 14/407,184, filed Dec. 11, 2014, Hosaka, et al.
U.S. Appl. No. 14/427,099, filed Mar. 10, 2015, Hosaka, et al.
U.S. Appl. No. 14/427,169, filed Mar. 10, 2015, Hosaka, et al.
U.S. Appl. No. 14/427,143, filed Mar. 10, 2015, Hosaka, et al.
Moore, Jr., Edward P., et al., "Polypropylene Handbook—Polymerization, Characterization, Properties, Processing, Applications," Hanser/Gardner Publications, Inc., Jul. 1996, pp. 12-13.
Extended European Search Report dated Sep. 6, 2016 in Patent Application No. 14756987.5.
Combined Chinese Office Action and Search Report dated Aug. 23, 2016 in Patent Application No. 2014800108103 (with English language translation).
Office Action in corresponding Russian Application No. 20151362534/04(055511).

* cited by examiner

*Primary Examiner* — Robert C Boyle
(74) *Attorney, Agent, or Firm* — Oblon, McClelland, Maier & Neustadt, L.L.P.

(57) ABSTRACT

A method for producing a propylene-based block copolymer ensures excellent olefin polymerization activity and activity with respect to hydrogen (hydrogen response) during polymerization, and produces a propylene-based block copolymer that exhibits a high MFR, high stereoregularity, and excellent rigidity. The method includes copolymerizing propylene and an α-olefin in the presence of a catalyst that includes (I) a solid catalyst component that includes titanium, magnesium, a halogen, and a compound represented by $R^1O-C(=O)-O-Z-OR^2$, and (II) a compound represented by $R^3_p\text{AlQ}_{3-p}$, to obtain a propylene-based block copolymer.

12 Claims, No Drawings

METHOD FOR PRODUCING PROPYLENE BLOCK COPOLYMER

TECHNICAL FIELD

The present invention relates to a method that produces a propylene-based block copolymer that exhibits rigidity and impact resistance in a well-balanced manner by utilizing a polymerization catalyst that ensures excellent second-step rubber component copolymerization characteristics (i.e., can introduce a large amount of high-quality rubber) when copolymerizing propylene and ethylene, or propylene and another α-olefin, by multistep polymerization.

BACKGROUND ART

An olefin (e.g., propylene) has been polymerized using an olefin polymerization catalyst. In particular, a propylene-based block copolymer that is obtained by effecting homopolymerization of propylene (or random copolymerization of propylene and a small amount of ethylene) in the first step, and effecting copolymerization of propylene and ethylene (or propylene and another α-olefin) in the second step, may be melted, molded using a molding machine, a stretching machine, or the like, and used for a variety of applications (e.g., automotive part, home appliance part, container, and film). In particular, since a propylene-ethylene block copolymer exhibits excellent mechanical properties (e.g., rigidity and heat resistance), and can be produced relatively inexpensively, a propylene-ethylene block copolymer has been used for a wide range of applications.

A solid catalyst component that includes magnesium, titanium, an electron donor compound, and a halogen atom as essential components has been known as a component of the olefin polymerization catalyst. A number of olefin polymerization catalysts that include the solid catalyst component, an organo aluminum compound, and an organosilicon compound, have been proposed.

A propylene-based block copolymer has been used by preference since the balance between rigidity and impact resistance is good. An olefin polymerization catalyst is required to have a capability to produce polypropylene that exhibits high stereoregularity in order to achieve a good balance between rigidity and impact resistance. In order to achieve high impact resistance, an olefin polymerization catalyst is required to have a capability to produce at least a specific amount of copolymer while ensuring high second-step copolymerization activity, and produce a copolymer with high randomness while ensuring high sustainability of polymerization activity and excellent controllability of the polymerization reaction.

A propylene-based block copolymer is a blend of a polymer component that mainly includes propylene, and a random copolymer component obtained by subjecting propylene and an α-olefin monomer (e.g., ethylene) to random copolymerization, and is normally produced by multistep polymerization that sequentially effects polymerization under conditions corresponding to each component to blend each component in the reactor. The propylene-based block copolymer is typically used for injection molding applications (e.g., automotive bumper). In recent years, it has been desired to increase the melt flow rate (MFR) of the propylene-based block copolymer in order to improve the productivity of the injection molding process. The MFR of the propylene-based block copolymer is uniquely determined by the MFR of the polymer component that includes propylene, the MFR of the random copolymer component obtained by subjecting propylene and an α-olefin monomer (e.g., ethylene) to random copolymerization, and the content of the random copolymer component in the block copolymer. It is necessary to increase the MFR and the content of the random copolymer component to a level equal to or higher than a given level in order to improve the quality (particularly impact strength) of the propylene-based block copolymer. It is necessary to effectively introduce the α-olefin (particularly ethylene) into the random copolymer part, and relatively reduce the content of crystalline polyethylene in order to maintain high quality. Therefore, development of a technique that achieves relatively high polymerization activity when producing the random copolymer part (rubber part) obtained by subjecting propylene and the α-olefin to random copolymerization, and efficiently introduces the α-olefin (e.g., ethylene) into the random copolymer part, has been desired.

The propylene-based block copolymer is required to exhibit impact strength when used for injection molding applications. In particular, the propylene-based block copolymer is required to exhibit improved low-temperature impact strength when used to produce an automotive bumper or the like. The low-temperature impact strength of the propylene-based block copolymer depends on the brittle temperature of the random copolymer component. If the propylene content in the random copolymer component is too high, the brittle temperature of the random copolymer component increases, and the low-temperature impact strength of the propylene-based block copolymer becomes insufficient. It is necessary to decrease the brittle temperature of the random copolymer component in order to increase the low-temperature impact strength of the propylene-based block copolymer. It has been considered that it is desirable to increase the α-olefin (e.g., ethylene) content in the random copolymer component in order to decrease the brittle temperature of the random copolymer component.

The propylene-based block copolymer production process has been improved from the viewpoint of implementing a simplified process, a reduction in production cost, an improvement in productivity, and the like. When the propylene-based block copolymer was initially produced on an industrial scale, it was necessary to remove a catalyst residue and an atactic polymer from the resulting propylene-based block copolymer since the performance of the catalyst was low, and a slurry polymerization process that utilizes a solvent or the like was mainly used. At present, a gas-phase polymerization process is mainly used along with a remarkable improvement in the performance of the catalyst. In particular, a gas-phase polymerization process that removes the heat of polymerization by utilizing the latent heat of liquefied propylene is advantageous in that high heat removal performance can be achieved using small-scale equipment.

The propylene-based block copolymer is normally produced by producing a polymer component (a) that mainly includes propylene in the first polymerization step, and producing a random copolymer component (b) in the second polymerization step by subjecting propylene and an α-olefin (e.g., ethylene) to random copolymerization. If the residence time distribution of the polymer particles that have been obtained by the first polymerization step and are subjected to the second polymerization step is wide, the reactor used for the second polymerization step may be fouled, or the impact strength of the block copolymer (product) may decrease. It is considered that such a problem occurs since the activity of the polymer particles that are subjected to the second polymerization step varies to a large extent due to the wide residence time distribution, and the amount of particles that produce the random copolymer component in the second polymerization step increases to a large extent. Therefore, it is desired to develop a production method that ensures that the polymer particles that are subjected to the second polymerization step exhibit high activity when polymerizing the random copolymer component, and the residence time is short (i.e., the residence time distribution is narrow). Accordingly, it is desired that the catalyst used for producing a propylene-based block copolymer exhibit relatively high activity during random copolymerization.

When producing polypropylene, hydrogen that has a capability to cause a chain transfer reaction is normally used as a molecular weight modifier. It is necessary to use hydrogen at a higher concentration in order to produce polypropylene having a higher MFR (i.e., lower molecular weight). When producing polypropylene having a high MFR using the gas-phase polymerization process that utilizes the latent heat of liquefied propylene, there is a tendency that the hydrogen concentration in unreacted gas increases, and the dew point decreases since hydrogen is used at a high concentration. As a result, productivity decreases due to removal of heat. A similar problem occurs when producing a random copolymer component having a high comonomer content using a comonomer having a low dew point (e.g., ethylene). Specifically, there is a tendency that the comonomer concentration in unreacted gas increases, and the dew point decreases since the comonomer is used at a high concentration. In this case, the heat removal performance in the recycle system becomes insufficient. When producing a propylene-based block copolymer having a high MFR, the heat removal performance and productivity decrease to a large extent in the first polymerization step. When producing a propylene-based block copolymer having a high ethylene content, the heat removal performance and productivity decrease to a large extent in the second polymerization step. In order to solve this problem, it is desirable that polypropylene having a high MFR can be produced at a lower hydrogen concentration, and a random copolymer component having a high ethylene content can be produced at a lower ethylene concentration. When the hydrogen concentration or the ethylene concentration is low, the hydrogen concentration or the ethylene concentration in unreacted gas decreases, and a decrease in dew point can be suppressed, so that productivity can be improved.

Several methods have been proposed that solve the above problem by improving the polymerization catalyst. For example, a method that utilizes a catalyst for which the hydrogen response is improved by utilizing an aluminum halide when producing the solid catalyst (see Patent Document 1), a method that utilizes an organoaluminum component and an organozinc component as a promoter (see Patent Document 2, for example), a method that utilizes an organosilicon compound that includes an amino group (see Patent Documents 3 to 5, for example), and the like have been proposed as a method that solves the problem of producing polypropylene having a high MFR. The olefin polymerization catalyst disclosed in Patent Document 1 exhibits excellent activity with respect to hydrogen (hydrogen response) as compared with known polymerization catalysts, and an olefin polymer obtained using the solid catalyst component disclosed in Patent Document 1 exhibits high fluidity (MFR) when melted, and is particularly useful when producing a large molded article by injection molding or the like. However, a catalyst that exhibits high activity when producing the random copolymer part, and can efficiently incorporate ethylene in the random copolymer part, has not yet been obtained. A method that utilizes a titanium compound that includes a Ti—N linkage (see Patent Document 6, for example), a method that utilizes an organosilicon compound and a saturated hydrocarbon during second-step polymerization (see Patent Document 7, for example), and the like have been proposed as a method that solves the problem of improving the copolymerizability of ethylene. However, an improvement in copolymerizability is still insufficient.

RELATED-ART DOCUMENT

Patent Document

Patent Document 1: JP-A-2012-214556
Patent Document 2: JP-A-8-67710
Patent Document 3: JP-A-8-3215
Patent Document 4: JP-A-2004-315742
Patent Document 5: JP-A-2005-48045
Patent Document 6: JP-A-6-228223
Patent Document 7: JP-A-9-87329

SUMMARY OF THE INVENTION

Technical Problem

Although the performance of the catalyst has been improved (see above), a technique that stably produces a propylene-based block copolymer that has a high rubber content and a high α-olefin (e.g., ethylene) content, and a technique that provides the resulting propylene-based block copolymer with sufficient overall performance such as excellent mechanical properties (e.g., rigidity, impact strength, and heat resistance), have not been proposed, and development of a technique that further improves the performance of the catalyst has been strongly desired.

Accordingly, an object of the invention is to provide a method that can produce a propylene-based block copolymer that has a high rubber content and a high α-olefin (e.g., ethylene) content, and exhibits rigidity and impact resistance in a well-balanced manner.

Solution to Problem

The inventors of the invention conducted extensive studies in view of the above situation. As a result, the inventors found that the above object can be achieved by effecting copolymerization using a copolymerization catalyst that includes a solid catalyst component that includes magnesium, titanium, a halogen, and a specific compound that includes an ether group and a carbonate group. This finding has led to the completion of the invention.

Specifically, one aspect of the invention provides a method for producing a propylene-based block copolymer including copolymerizing propylene and an α-olefin in the presence of a copolymerization catalyst that includes:

(I) a solid catalyst component that includes titanium, magnesium, a halogen, and a compound represented by the following general formula (1), $$R^1O—C(=O)—O—Z—OR^2 \tag{1}$$

wherein $R^1$ and $R^2$ are a linear alkyl group having 1 to 20 carbon atoms, a branched alkyl group having 3 to 20 carbon atoms, a vinyl group, a linear or branched alkenyl group having 3 to 20 carbon atoms, a linear halogen-substituted alkyl group having 1 to 20 carbon atoms, a branched halogen-substituted alkyl group having 3 to 20 carbon atoms, a linear halogen-substituted alkenyl group having 2 to 20 carbon atoms, a branched halogen-substituted alkenyl group having 3 to 20 carbon atoms, a cycloalkyl group having 3 to 20 carbon atoms, a cycloalkenyl group having 3 to 20 carbon atoms, a halogen-substituted cycloalkyl group having 3 to 20 carbon atoms, a halogen-substituted cycloalkenyl group having 3 to 20 carbon atoms, an aromatic hydrocarbon group having 6 to 24 carbon atoms, a halogen-substituted aromatic hydrocarbon group having 6 to 24 carbon atoms, a nitrogen atom-containing hydrocarbon group having 2 to 24 carbon atoms that is terminated by a carbon atom, an oxygen atom-containing hydrocarbon group having 2 to 24 carbon atoms that is terminated by a carbon atom, a phosphorus-containing hydrocarbon group having 2 to 24 carbon atoms that is terminated by a carbon atom, or a silicon-containing hydrocarbon group having 1 to 24 carbon atoms, provided that $R^1$ and $R^2$ are either identical or different, the nitrogen atom-containing hydrocarbon group having 2 to 24 carbon atoms excludes a group that is terminated by a C=N group, the oxygen atom-containing hydrocarbon group having 2 to 24 carbon atoms excludes a group that is terminated by a carbonyl group, and the phosphorus-containing hydrocarbon group having 2 to 24 carbon atoms excludes a group that is terminated by a C=P group, and Z is a linking group that includes a carbon atom or a carbon chain;

(II) an organoaluminum compound represented by the following general formula (2),

(2)

wherein $R^3$ is a hydrocarbyl group having 1 to 6 carbon atoms, provided that a plurality of $R^3$ are either identical or different when a plurality of $R^3$ are present, Q is a hydrogen atom, a hydrocarbyloxy group having 1 to 6 carbon atoms, or a halogen atom, and p is a real number that satisfies $0<p\leq3$; and (III) an external electron donor compound.

Advantageous Effects of the Invention

The method for producing a propylene-based block copolymer according to one aspect of the invention can produce a propylene-based block copolymer that exhibits high rigidity and high impact resistance in high yield.

DESCRIPTION OF EMBODIMENTS

Solid Catalyst Component for Copolymerization that Forms Catalyst

A solid catalyst component for copolymerization (hereinafter may be referred to as "component (I)" or "solid catalyst component (I)") used in connection with a method for producing a propylene-based block copolymer according to one embodiment of the invention includes magnesium, titanium, a halogen, and an electron donor compound represented by the general formula (1) (hereinafter may be referred to as "component (A)" or "compound (A)") as essential components.

Examples of the halogen include fluorine, chlorine, bromine, and iodine. Among these, chlorine, bromine, and iodine are preferable, and chlorine and iodine are particularly preferable.

Examples of the linear alkyl group having 1 to 20 carbon atoms that may be represented by $R^1$ and $R^2$ in the general formula (1) include a methyl group, an ethyl group, an n-propyl group, an n-butyl group, an n-pentyl group, an n-hexyl group, an n-pentyl group, an n-octyl group, an n-nonyl group, an n-decyl group, and the like. Among these, linear alkyl groups having 1 to 12 carbon atoms are preferable.

Examples of the branched alkyl group having 3 to 20 carbon atoms that may be represented by $R^1$ and $R^2$ include an alkyl group that includes a secondary carbon atom or a tertiary carbon atom (e.g., isopropyl group, isobutyl group, t-butyl group, isopentyl group, and neopentyl group). Among these, branched alkyl groups having 3 to 12 carbon atoms are preferable.

Examples of the linear alkenyl group having 3 to 20 carbon atoms that may be represented by $R^1$ and $R^2$ include an allyl group, a 3-butenyl group, a 4-hexenyl group, a 5-hexenyl group, a 7-octenyl group, a 10-dodecenyl group, and the like. Among these, linear alkenyl groups having 3 to 12 carbon atoms are preferable. Examples of the branched alkenyl group having 3 to 20 carbon atoms include an isopropenyl group, an isobutenyl group, an isopentenyl group, a 2-ethyl-3-hexenyl group, and the like. Among these, branched alkenyl groups having 3 to 12 carbon atoms are preferable.

Examples of the linear halogen-substituted alkyl group having 1 to 20 carbon atoms that may be represented by $R^1$ and $R^2$ include a methyl halide group, an ethyl halide group, an n-propyl halide group, an n-butyl halide group, an n-pentyl halide group, an n-hexyl halide group, an n-pentyl halide group, an n-octyl halide group, a nonyl halide group, a decyl halide group, a halogen-substituted undecyl group, a halogen-substituted dodecyl group, and the like. Among these, linear halogen-substituted alkyl groups having 1 to 12 carbon atoms are preferable. Examples of the branched halogen-substituted alkyl group having 3 to 20 carbon atoms include an isopropyl halide group, an isobutyl halide group, a 2-ethylhexyl halide group, a neopentyl halide group, and the like. Among these, branched halogen-substituted alkyl groups having 3 to 12 carbon atoms are preferable.

Examples of the linear halogen-substituted alkenyl group having 2 to 20 carbon atoms that may be represented by $R^1$ and $R^2$ include a 2-halogenated vinyl group, a 3-halogenated allyl group, a 3-halogenated 2-butenyl group, a 4-halogenated 3-butenyl group, a perhalogenated 2-butenyl group, a 6-halogenated 4-hexenyl group, a 3-trihalogenated methyl-2-propenyl group, and the like. Among these, halogen-substituted alkenyl groups having 2 to 12 carbon atoms are preferable. Examples of the branched halogen-substituted alkenyl group having 3 to 20 carbon atoms include a 3-trihalogenated 2-butenyl group, a 2-pentahalogenated ethyl-3-hexenyl group, a 6-halogenated 3-ethyl-4-hexenyl group, a 3-halogenated isobutenyl group, and the like. Among these, branched halogen-substituted alkenyl groups having 3 to 12 carbon atoms are preferable.

Examples of the cycloalkyl group having 3 to 20 carbon atoms that may be represented by $R^1$ and $R^2$ include a cyclopropyl group, a cyclobutyl group, a cyclopentyl group, a tetramethylcyclopentyl group, a cyclohexyl group, a methylcyclohexyl group, a cycloheptyl group, a cyclooctyl group, a cyclononyl group, a cyclodecyl group, a butylcyclopentyl group, and the like. Among these, cycloalkyl groups having 3 to 12 carbon atoms are preferable. Examples of the cycloalkenyl group having 3 to 20 carbon atoms include a cyclopropenyl group, a cyclopentenyl group, a cyclohexenyl group, a cyclooctenyl group, a norbornene group, and the like. Among these, cycloalkenyl groups having 3 to 12 carbon atoms are preferable.

Examples of the halogen-substituted cycloalkyl group having 3 to 20 carbon atoms that may be represented by $R^1$ and $R^2$ include a halogen-substituted cyclopropyl group, a halogen-substituted cyclobutyl group, a halogen-substituted cyclopentyl group, a halogen-substituted trimethylcyclopentyl group, a halogen-substituted cyclohexyl group, a halogen-substituted methylcyclohexyl group, a halogen-substituted cycloheptyl group, a halogen-substituted cyclooctyl group, a halogen-substituted cyclononyl group, a halogen-substituted cyclodecyl group, a halogen-substituted butylcyclopentyl group, and the like. Among these, halogen-substituted cycloalkyl groups having 3 to 12 carbon atoms are preferable.

Examples of the halogen-substituted cycloalkenyl group having 3 to 20 carbon atoms that may be represented by $R^1$ and $R^2$ include a halogen-substituted cyclopropenyl group, a halogen-substituted cyclobutenyl group, a halogen-substituted cyclopentenyl group, a halogen-substituted trimethylcyclopentenyl group, a halogen-substituted cyclohexenyl group, a halogen-substituted methylcyclohexenyl group, a halogen-substituted cycloheptenyl group, a halogen-substituted cyclooctenyl group, and halogen-substituted cyclononenyl group, a halogen-substituted cyclodecenyl group, a halogen-substituted butylcyclopentenyl group, and the like. Among these, halogen-substituted cycloalkenyl groups having 3 to 12 carbon atoms are preferable.

Examples of the aromatic hydrocarbon group having 6 to 24 carbon atoms that may be represented by $R^1$ and $R^2$ include a phenyl group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, a 1,8-dimethylnaphthyl group, and the like. Among these, aromatic hydrocarbon groups having 6 to 12 carbon atoms are preferable.

Examples of the halogen-substituted aromatic hydrocarbon group having 6 to 24 carbon atoms that may be represented by $R^1$ and $R^2$ include a phenyl halide group, a methylphenyl halide group, a methylphenyl trihalide group, a benzyl perhalide group, a phenyl perhalide group, a 2-phenyl-2-halogenated ethyl group, a naphthyl perhalide group, a 4-phenyl-2,3-dihalogenated butyl group, and the like. Among these, halogen-substituted aromatic hydrocarbon groups having 6 to 12 carbon atoms are preferable.

Examples of the halogen included in the halogen-substituted alkyl group, the halogen-substituted alkenyl group, the halogen-substituted cycloalkyl group, the halogen-substituted cycloalkenyl group, and the halogen-substituted aromatic hydrocarbon group that may be represented by $R^1$ and $R^2$ include fluorine, chlorine, bromine, and iodine. Among these, fluorine, chlorine, and bromine are preferable.

Examples of the nitrogen atom-containing hydrocarbon group having 2 to 24 carbon atoms that is terminated by a carbon atom (excluding a group that is terminated by a C=N group) that may be represented by $R^1$ and $R^2$ include an alkylaminoalkyl group such as a methylaminomethyl group, a dimethylaminomethyl group, an ethylaminomethyl group, a diethylaminomethyl group, a propylaminomethyl group, a dipropylaminomethyl group, a methylaminoethyl group, a dimethylaminoethyl group, an ethylaminoethyl group, a diethylaminoethyl group, a propylaminoethyl group, a dipropylaminoethyl group, a butylaminoethyl group, a dibutylaminoethyl group, a pentylaminoethyl group, a dipentylaminoethyl group, a hexylaminoethyl group, a hexylmethylaminoethyl group, a heptylmethylaminoethyl group, a diheptylaminomethyl group, an octylmethylaminoethyl group, a dioctylaminoethyl group, a nonylaminomethyl group, a dinonylaminomethyl group, a decylaminomethyl group, a didecylamino group, a cyclohexylaminomethyl group, and a dicyclohexylaminomethyl group, an arylaminoalkyl group or an alkylarylaminoalkyl group such as a phenylaminomethyl group, a diphenylaminomethyl group, a ditolylaminomethyl group, a dinaphthylaminomethyl group, and a methylphenylaminomethyl group, a polycyclic aminoalkyl group, an amino group-containing aromatic hydrocarbon group such as an anilino group, a dimethylaminophenyl group, and a bisdimethylaminophenyl group, an iminoalkyl group such as a methyliminomethyl group, an ethyliminoethyl group, a propylimino group, a butylimino group, and a phenylimino group, and the like. Among these, nitrogen atom-containing hydrocarbon groups having 2 to 12 carbon atoms are preferable. Note that the expression "terminated by" used herein in connection with $R^1$ and $R^2$ means that $R^1$ or $R^2$ is bonded to the adjacent oxygen atom through an atom or a group by which $R^1$ or $R^2$ is terminated.

Examples of the oxygen atom-containing hydrocarbon group having 2 to 24 carbon atoms that is terminated by a carbon atom (excluding a group that is terminated by a carbonyl group) that may be represented by $R^1$ and $R^2$ include an ether group-containing hydrocarbon group such as a methoxymethyl group, an ethoxymethyl group, a propoxymethyl group, a butoxymethyl group, an isopropoxymethyl group, an isobutoxymethyl group, a methoxyethyl group, an ethoxyethyl group, a propoxyethyl group, a butoxyethyl group, an isopropoxyethyl group, and an isobutoxyethyl group, an aryloxyalkyl group such as a phenoxymethyl group, a methylphenoxymethyl group, a dimethylphenoxymethyl group, and a naphthoxymethyl group, an alkoxyaryl group such as a methoxyphenyl group and an ethoxyphenyl group, an acetoxymethyl group, and the like. Among these, oxygen atom-containing hydrocarbon groups having 2 to 12 carbon atoms are preferable. Note that the expression "terminated by" used herein in connection with $R^1$ and $R^2$ means that $R^1$ or $R^2$ is bonded to the adjacent oxygen atom through an atom or a group by which $R^1$ or $R^2$ is terminated.

Examples of the phosphorus-containing hydrocarbon group having 2 to 24 carbon atoms that is terminated by a carbon atom (excluding a group that is terminated by a C=P group) represented by $R^1$ and $R^2$ include a dialkylphosphinoalkyl group such as a dimethylphosphinomethyl group, a dibutylphosphinomethyl group, a dicyclohexylphosphinomethyl group, a dimethylphosphinoethyl group, a dibutylphosphinoethyl group, and a dicyclohexylphosphinoethyl group, a diarylphosphinoalkyl group such as a diphenylphosphinomethyl group and a ditolylphosphinomethyl group, a phosphino group-substituted aryl group such as a dimethylphosphinophenyl group and a diethylphosphinophenyl group, and the like. Among these, phosphorus-containing hydrocarbon groups having 2 to 12 carbon atoms are preferable. Note that the expression "terminated by" used herein in connection with $R^1$ and $R^2$ means that $R^1$ or $R^2$ is bonded to the adjacent oxygen atom through an atom or a group by which $R^1$ or $R^2$ is terminated.

Examples of the silicon-containing hydrocarbon group having 1 to 24 carbon atoms that may be represented by $R^1$ and $R^2$ include a hydrocarbon-substituted silyl group, a hydrocarbon-substituted siloxyalkyl group, a hydrocarbon-substituted silylalkyl group, a hydrocarbon-substituted silylaryl group, and the like. Specific examples of the silicon-containing hydrocarbon group having 1 to 24 carbon atoms include a hydrocarbon-substituted silyl group such as a phenylsilyl group, a diphenylsilyl group, a trimethylsilyl group, a triethylsilyl group, a tripropylsilyl group, a tricyclohexylsilyl group, a triphenylsilyl group, a methyldiphenylsilyl group, a tritolylsilyl group, and a trinaphthylsilyl group, a siloxy hydrocarbon group such as a trimethylsiloxymethyl group, a trimethylsiloxyethyl group, and a trimethylsiloxyphenyl group, a hydrocarbon-substituted silyl ether group such as a trimethyl silyl ether group, a silicon-substituted alkyl group such as a trimethylsilylmethyl group, a silicon-substituted aryl group such as a trimethylsilylphenyl group, and the like. Among these, silicon-containing hydrocarbon groups having 1 to 12 carbon atoms are preferable.

$R^1$ is preferably a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a linear or branched halogen-substituted alkenyl group having 3 to 12 carbon atoms, a cycloalkyl group having 3 to 12 carbon atoms, a cycloalkenyl group having 3 to 12 carbon atoms, a halogen-substituted cycloalkyl group having 3 to 12 carbon atoms, a halogen-substituted cycloalkenyl group having 3 to 12 carbon atoms, or an aromatic hydrocarbon group having 6 to 12 carbon atoms. $R^1$ is more preferably a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a cycloalkyl group having 3 to 12 carbon atoms, a cycloalkenyl group having 3 to 12 carbon atoms, or an aromatic hydrocarbon group having 6 to 12 carbon atoms. $R^1$ is particularly preferably a linear alkyl group having 1 to 12 carbon atoms, a branched alkyl group having 3 to 12 carbon atoms, or an aromatic hydrocarbon group having 6 to 12 carbon atoms.

$R^2$ is preferably a linear alkyl group having 1 to 12 carbon atoms, a branched alkyl group having 3 to 12 carbon atoms that is terminated by —$CH_2$—, a vinyl group, a linear alkenyl group having 3 to 12 carbon atoms, a branched alkenyl group having 3 to 12 carbon atoms that is terminated by —$CH_2$—, a linear halogen-substituted alkyl group having 1 to 12 carbon atoms that is terminated by —$CH_2$—, a branched halogen-substituted alkyl group having 3 to 12 carbon atoms that is terminated by —$CH_2$—, a linear halogen-substituted alkenyl group having 3 to 12 carbon atoms, a branched halogen-substituted alkenyl group having 3 to 12 carbon atoms that is terminated by —$CH_2$—, a cycloalkyl group having 4 to 12 carbon atoms that is terminated by —$CH_2$—, a cycloalkenyl group having 4 to 12 carbon atoms that is terminated by —$CH_2$—, a halogen-substituted cycloalkyl group having 4 to 12 carbon atoms that is terminated by —$CH_2$—, a halogen-substituted cycloalkenyl group having 4 to 12 carbon atoms that is terminated by —$CH_2$—, or an aromatic hydrocarbon group having 7 to 12 carbon atoms that is terminated by —$CH_2$—. $R^2$ is more preferably a linear alkyl group having 1 to 12 carbon atoms, a branched alkyl group having 3 to 12 carbon atoms that is terminated by —$CH_2$—, a branched alkenyl group having 3 to 12 carbon atoms that is terminated by —$CH_2$—, a linear halogen-substituted alkyl group having 1 to 12 carbon atoms that is terminated by —$CH_2$—, a branched halogen-substituted alkyl group having 3 to 12 carbon atoms that is terminated by —$CH_2$—, a branched halogen-substituted alkenyl group having 3 to 12 carbon atoms that is terminated by —$CH_2$—, a cycloalkyl group having 4 to 12 carbon atoms that is terminated by —$CH_2$—, a cycloalkenyl group having 4 to 12 carbon atoms that is terminated by —$CH_2$—, a halogen-substituted cycloalkyl group having 4 to 12 carbon atoms that is terminated by —$CH_2$—, a halogen-substituted cycloalkenyl group having 4 to 12 carbon atoms that is terminated by —$CH_2$—, or an aromatic hydrocarbon group having 7 to 12 carbon atoms that is terminated by —$CH_2$—. $R^2$ is particularly preferably a linear alkyl group having 1 to 12 carbon atoms, a branched alkyl group having 3 to 12 carbon atoms that is terminated by —$CH_2$—, or an aromatic hydrocarbon group having 7 to 12 carbon atoms that is terminated by —$CH_2$—. Note that the expression "terminated by" used herein in connection with $R^2$ means that $R^2$ is bonded to the adjacent oxygen atom through an atom or a group by which $R^2$ is terminated.

Z in the general formula (1) is a divalent linking group that bonds the carbonate group and the ether group ($OR^2$). The two oxygen atoms bonded to Z (i.e., bonded through Z) are preferably bonded through a carbon chain. The carbon chain preferably includes two carbon atoms. When Z is a cyclic group (e.g., cycloalkylene group, cycloalkenylene group, halogen-substituted cycloalkylene group, halogen-substituted cycloalkenylene group, aromatic hydrocarbon group, or halogen-substituted aromatic hydrocarbon group), the two oxygen atoms bonded to Z may be bonded through two neighboring carbon atoms that form the cyclic group.

Z is preferably a linear alkylene group having 1 to 20 carbon atoms, a branched alkylene group having 3 to 20 carbon atoms, a vinylene group, a linear or branched alkenylene group having 3 to 20 carbon atoms, a linear halogen-substituted alkylene group having 1 to 20 carbon atoms, a branched halogen-substituted alkylene group having 3 to 20 carbon atoms, a linear or branched halogen-substituted alkenylene group having 3 to 20 carbon atoms, a cycloalkylene group having 3 to 20 carbon atoms, a cycloalkenylene group having 3 to 20 carbon atoms, a halogen-substituted cycloalkylene group having 3 to 20 carbon atoms, a halogen-substituted cycloalkenylene group having 3 to 20 carbon atoms, an aromatic hydrocarbon group having 6 to 24 carbon atoms, a halogen-substituted aromatic hydrocarbon group having 6 to 24 carbon atoms, a nitrogen atom-containing hydrocarbon group having 1 to 24 carbon atoms, an oxygen atom-containing hydrocarbon group having 1 to 24 carbon atoms, a phosphorus-containing hydrocarbon group having 1 to 24 carbon atoms, or a silicon-containing hydrocarbon group having 1 to 24 carbon atoms.

Z is more preferably an ethylene group having 2 carbon atoms, a branched alkylene group having 3 to 12 carbon atoms, a vinylene group, a linear or branched alkenylene group having 3 to 12 carbon atoms, a linear halogen-substituted alkylene group having 2 to 12 carbon atoms, a branched halogen-substituted alkylene group having 3 to 12 carbon atoms, a linear or branched halogen-substituted alkenylene group having 3 to 12 carbon atoms, a cycloalkylene group having 3 to 12 carbon atoms, a cycloalkenylene group having 3 to 12 carbon atoms, a halogen-substituted cycloalkylene group having 3 to 12 carbon atoms, a halogen-substituted cycloalkenylene group having 3 to 12 carbon atoms, an aromatic hydrocarbon group having 6 to 12 carbon atoms, a halogen-substituted aromatic hydrocarbon group having 6 to 12 carbon atoms, a nitrogen atom-containing hydrocarbon group having 2 to 12 carbon atoms, an oxygen atom-containing hydrocarbon group having 2 to 12 carbon atoms, a phosphorus-containing hydrocarbon group having 2 to 12 carbon atoms, or a silicon-containing hydrocarbon group having 2 to 12 carbon atoms. Z is particularly preferably a bidentate linking group selected from an ethylene group having 2 carbon atoms and a branched alkylene group having 3 to 12 carbon atoms. Note that the term "bidentate linking group" means that two oxygen atoms bonded to Z are bonded through a carbon chain, and the carbon chain includes two carbon atoms.

Examples of the linear alkylene group having 1 to 20 carbon atoms that may be represented by Z include an ethylene group, a trimethylene group, a tetramethylene group, a pentamethylene group, a hexamethylene group, a heptamethylene group, an octamethylene group, a nonamethylene group, a decamethylene group, an undecamethylene group, a dodecamethylene group, a tridecamethylene group, a tetradecamethylene group, and the like. Among these, linear alkylene groups having 2 to 12 carbon atoms are preferable. An ethylene group is still more preferable.

Examples of the branched alkylene group having 3 to 20 carbon atoms that may be represented by Z include a 1-methylethylene group, a 2-methyltrimethylene group, a 2-methyltetramethylene group, a 2-methylpentamethylene group, a 3-methylhexamethylene group, a 4-methylheptamethylene group, a 4-methyloctamethylene group, a 5-methylnonamethylene group, a 5-methyldecamethylene group, a 6-methylundecamethylene group, a 7-methyldodecamethylene group, a 7-methyltridecamethylene group, and the like. Among these, branched alkylene groups having 3 to 12 carbon atoms are preferable. A 1-methylethylene group, a 2-methylethylene group, and a 1-ethylethylene group are more preferable.

Examples of the linear alkenylene group having 3 to 20 carbon atoms that may be represented by Z include a propenylene group, a butenylene group, a hexenylene group, an octenylene group, an octadecenylene group, and the like. Among these, linear alkenylene groups having 3 to 12 carbon atoms are preferable.

Examples of the branched alkenylene group having 3 to 20 carbon atoms that may be represented by Z include an isopropenylene group, a 1-ethylethenylene group, a 2-methylpropenylene group, a 2,2-dimethylbutenylene group, a 3-methyl-2-butenylene group, a 3-ethyl-2-butenylene group, a 2-methyloctenylene group, a 2,4-dimethyl-2-butenylene group, and the like. Among these, branched alkenylene groups having 3 to 12 carbon atoms that include an ethenylene group are preferable. An isopropenylene group and a 1-ethylethenylene group are more preferable.

Examples of the linear halogen-substituted alkenylene group having 1 to 20 carbon atoms that may be represented by Z include a dichloroethenylene group, a difluoroethenylene group, a 3,3-dichloropropenylene group, a 1,2-difluoropropenylene group, and the like. Among these, linear halogen-substituted alkenylene groups having 3 to 12 carbon atoms are preferable.

Examples of the branched halogen-substituted alkylene group having 1 to 20 carbon atoms that may be represented by Z include a 3,4-dichloro-1,2-butylene group, 2,2-dichloro-1,3-butylene group, a 1,2-difluoro-1,2-propylene group, and the like. Among these, branched halogen-substituted alkylene groups having 3 to 12 carbon atoms are preferable.

Examples of the cycloalkylene group having 3 to 20 carbon atoms that may be represented by Z include a cyclopentylene group, a cyclohexylene group, a cyclopropylene group, a 2-methylcyclopropylene group, a cyclobutylene group, a 2,2-dimethylcyclobutylene group, a 2,3-dimethylcyclopentylene group, a 1,3,3-trimethylcyclohexylene group, a cyclooctylene group, and the like. Among these, cycloalkylene groups having 3 to 12 carbon atoms are preferable.

Examples of the cycloalkenylene group having 3 to 20 carbon atoms that may be represented by Z include a cyclopentenylene group, a 2,4-cyclopentadienylene group, a cyclohexenylene group, a 1,4-cyclohexadienyl group, a cycloheptenylene group, a methylcyclopentenylene group, a methylcyclohexenylene group, a methylcycloheptenylene group, a dicyclodecylene group, a tricyclodecylene group, and the like. Among these, cycloalkenylene groups having 3 to 12 carbon atoms are preferable.

Examples of the halogen-substituted cycloalkylene group having 3 to 20 carbon atoms that may be represented by Z include a 3-chloro-1,2-cyclopentylene group, a 3,4,5,6-tetrachloro-1,2-cyclohexylene group, a 3,3-dichloro-1,2-cyclopropylene group, a 2-chloromethylcyclopropylene group, a 3,4-dichloro-1,2-cyclobutylene group, a 3,3-bis(dichloromethyl)-1,2-cyclobutylene group, a 2,3-bis(dichloromethyl)cyclopentylene group, a 1,3,3-tris(fluoromethyl)-1,2-cyclohexylene group, a 3-trichloromethyl-1,2-cyclooctylene group, and the like. Among these, halogen-substituted cycloalkylene groups having 3 to 12 carbon atoms are preferable.

Examples of the halogen-substituted cycloalkenylene group having 3 to 20 carbon atoms that may be represented by Z include a 5-chloro-1,2-cyclo-4-hexenylene group, a 3,3,4,4-tetrafluoro-1,2-cyclo-6-octenylene group, and the like. Among these, halogen-substituted cycloalkenylene groups having 3 to 12 carbon atoms are preferable.

Examples of the aromatic hydrocarbon group having 6 to 24 carbon atoms that may be represented by Z include a 1,2-phenylene group, a 3-methyl-1,2-phenylene group, a 3,6-dimethyl-1,2-phenylene group, a 1,2-naphthylene group, a 2,3-naphthylene group, a 5-methyl-1,2-naphthylene group, a 9,10-phenanthrylene group, a 1,2-anthracenylene group, and the like. Among these, aromatic hydrocarbon groups having 6 to 12 carbon atoms are preferable.

Examples of the halogen-substituted aromatic hydrocarbon group having 6 to 24 carbon atoms that may be represented by Z include a 3-chloro-1,2-phenylene group, a 3-chloromethyl-1,2-phenylene group, a 3,6-dichloro-1,2-phenylene group, a 3,6-dichloro-4,5-dimethyl-1,2-phenylene group, a 3-chloro-1,2-naphthylene group, a 3-fluoro-1,2-naphthylene group, a 3,6-dichloro-1,2-phenylene group, a 3,6-difluoro-1,2-phenylene group, a 3,6-dibromo-1,2-phenylene group, a 1-chloro-2,3-naphthylene group, a 5-chloro-1,2-naphthylene group, a 2,6-dichloro-9,10-phenanthrylene group, a 5,6-dichloro-1,2-anthracenylene group, a 5,6-difluoro-1,2-anthracenylene, and the like. Among these, halogen-substituted aromatic hydrocarbon groups having 6 to 12 carbon atoms are preferable.

Examples of the nitrogen atom-containing hydrocarbon group having 1 to 24 carbon atoms that may be represented by Z include a 1-dimethylaminoethylene group, a 1,2-bisdimethylaminoethylene group, a 1-diethylaminoethylene group, a 2-diethylamino-1,3-propylene group, a 2-ethylamino-1,3-propylene group, a 4-dimethylamino-1,2-phenylene group, a 4,5-bis(dimethylamino)phenylene group, and the like. Among these, nitrogen atom-containing hydrocarbon groups having 2 to 12 carbon atoms are preferable.

Examples of the oxygen atom-containing hydrocarbon group having 1 to 24 carbon atoms that may be represented by Z include a 1-methoxyethylene group, a 2,2-dimethoxy-1,3-propanylene group, a 2-ethoxy-1,3-propanylene group, a 2-t-butoxy-1,3-propanylene group, a 2,3-dimethoxy-2,3-butylene group, a 4-methoxy-1,2-phenylene group, and the like. Among these, oxygen atom-containing hydrocarbon groups having 2 to 12 carbon atoms are preferable.

Examples of the phosphorus-containing hydrocarbon group having 1 to 24 carbon atoms that may be represented by Z include a 1-dimethylphosphinoethylene group, a 2,2- bis(dimethylphosphino)-1,3-propanylene group, a 2-diethylphosphino-1,3-propanylene group, a 2-t-butoxymethylphosphino-1,3-propanylene group, a 2,3-bis(diphenylphospino)-2,3-butylene group, a 4-methylphosphate-1,2-phenylene group, and the like. Among these, phosphorus-containing hydrocarbon groups having 1 to 12 carbon atoms are preferable.

Examples of the silicon-containing hydrocarbon group having 1 to 24 carbon atoms that may be represented by Z include a trimethylsilylethylene group, a 1,2-bis(trimethylsilypethylene group, a 1,2-bis(trimethylsiloxy)ethylene group, a 2,2-bis(4-trimethylsilylphenyl)-1,3-propanylene group, a 1,2-bis(monomethylsilane)ethylene group, and the like. Among these, silicon-containing hydrocarbon groups having 1 to 12 carbon atoms are preferable.

Specific examples of the compound represented by the general formula (1) include 2-methoxyethyl methyl carbonate, 2-ethoxyethyl methyl carbonate, 2-propoxyethyl methyl carbonate, 2-butoxyethyl methyl carbonate, 2-(2-ethoxyethyloxy)ethyl methyl carbonate, 2-benzyloxyethyl methyl carbonate, 2-methoxypropyl methyl carbonate, 2-ethoxypropyl methyl carbonate, 2-methyl-2-methoxybutyl methyl carbonate, 2-methyl-2-ethoxybutyl methyl carbonate, 2-methyl-2-methoxypentyl methyl carbonate, 2-methyl-2-ethoxypentyl methyl carbonate, 1-phenyl-2-methoxypropyl methyl carbonate, 1-phenyl-2-ethoxypropyl methyl carbonate, 1-phenyl-2-benzyloxypropyl methyl carbonate, 1-phenyl-2-methoxyethyl methyl carbonate, 1-phenyl-2-ethoxyethyl methyl carbonate, 1-methyl-1-phenyl-2-methoxyethyl methyl carbonate, 1-methyl-1-phenyl-2-ethoxyethyl methyl carbonate, 1-methyl-1-phenyl-2-benzyloxyethyl methyl carbonate, 1-methyl-1-phenyl-2-(2-ethoxyethyloxy)ethyl methyl carbonate, 2-methoxyethyl ethyl carbonate, 2-ethoxyethyl ethyl carbonate, 1-phenyl-2-methoxyethyl ethyl carbonate, 1-phenyl-2-ethoxyethyl ethyl carbonate, 1-phenyl-2-propoxyethyl ethyl carbonate, 1-phenyl-2-butoxyethyl ethyl carbonate, 1-phenyl-2-isobutyloxyethyl ethyl carbonate, 1-phenyl-2-(2-ethoxyethyloxy)ethyl ethyl carbonate, 1-methyl-1-phenyl-2-methoxyethyl ethyl carbonate, 1-methyl-1-phenyl-2-ethoxyethyl ethyl carbonate, 1-methyl-1-phenyl-2-propoxyethyl ethyl carbonate, 1-methyl-1-phenyl-2-butoxyethyl ethyl carbonate, 1-methyl-1-phenyl-2-isobutyloxyethyl ethyl carbonate, 1-methyl-1-phenyl-2-benzyloxyethyl ethyl carbonate, 1-methyl-1-phenyl-2-(2-ethoxyethyloxy)ethyl ethyl carbonate, 2-methoxyethyl phenyl carbonate, 2-ethoxyethyl phenyl carbonate, 2-propoxyethyl phenyl carbonate, 2-butoxyethyl phenyl carbonate, 2-isobutyloxyethyl phenyl carbonate, 2-benzyloxyethyl phenyl carbonate, 2-(2-ethoxyethyloxyethyl) phenyl carbonate, 2-methoxyethyl p-methylphenyl carbonate, 2-ethoxyethyl p-methylphenyl carbonate, 2-propoxyethyl p-methylphenyl carbonate, 2-butoxyethyl p-methylphenyl carbonate, 2-isobutyloxyethyl p-methylphenyl carbonate, 2-benzyloxyethyl p-methylphenyl carbonate, 2-(2-ethoxyethyloxy)ethyl p-methylphenyl carbonate, 2-methoxyethyl o-methylphenyl carbonate, 2-ethoxyethyl o-methylphenyl carbonate, 2-propoxyethyl o-methylphenyl carbonate, 2-butoxyethyl o-methylphenyl carbonate, 2-isobutyloxyethyl o-methylphenyl carbonate, 2-benzyloxyethyl o-methylphenyl carbonate, 2-(2-ethoxyethyloxy)ethyl o-methylphenyl carbonate,
2-methoxyethyl o,p-dimethylphenyl carbonate, 2-ethoxyethyl o,p-dimethylphenyl carbonate, 2-propoxyethyl o,p-dimethylphenyl carbonate, 2-butoxyethyl o,p-dimethylphenyl carbonate, 2-isobutyloxyethyl o,p-dimethylphenyl carbonate, 2-benzyloxyethyl o,p-dimethylphenyl carbonate, 2-(2-ethoxyethyloxy)ethyl o,p-dimethylphenyl carbonate, 2-methoxypropyl phenyl carbonate, 2-ethoxypropyl phenyl carbonate, 2-propoxypropyl phenyl carbonate, 2-butoxypropyl phenyl carbonate, 2-isobutyloxypropyl phenyl carbonate, 2-(2-ethoxyethyloxy)propyl phenyl carbonate,
2-phenyl-2-methoxyethyl phenyl carbonate, 2-phenyl-2-ethoxyethyl phenyl carbonate, 2-phenyl-2-propoxyethyl phenyl carbonate, 2-phenyl-2-butoxyethyl phenyl carbonate, 2-phenyl-2-isobutyloxyethyl phenyl carbonate, 2-phenyl-2-(2-ethoxyethyloxy)ethyl phenyl carbonate,
1-phenyl-2-methoxypropyl phenyl carbonate, 1-phenyl-2-ethoxypropyl phenyl carbonate, 1-phenyl-2-propoxypropyl phenyl carbonate, 1-phenyl-2-isobutyloxypropyl phenyl carbonate, 1-phenyl-2-methoxyethyl phenyl carbonate, 1-phenyl-2-ethoxyethyl phenyl carbonate, 1-phenyl-2-propoxyethyl phenyl carbonate, 1-phenyl-2-butoxyethyl phenyl carbonate, 1-phenyl-2-isobutyloxyethyl phenyl carbonate, 1-phenyl-2-(2-ethoxyethyloxy)ethyl phenyl carbonate,
1-methyl-1-phenyl-2-methoxyethyl phenyl carbonate, 1-methyl-1-phenyl-2-ethoxyethyl phenyl carbonate, 1-methyl-1-phenyl-2-propoxyethyl phenyl carbonate, 1-methyl-1-phenyl-2-butoxyethyl phenyl carbonate, 1-methyl-1-phenyl-2-isobutyloxyethyl phenyl carbonate, 1-methyl-1-phenyl-2-benzyloxyethyl phenyl carbonate, and 1-methyl-1-phenyl-2-(2-ethoxyethyloxy)ethyl phenyl carbonate. It is preferable to use one compound, or two or more compounds, selected from 2-ethoxyethyl methyl carbonate, 2-ethoxyethyl ethyl carbonate, 2-propoxyethyl propyl carbonate, 2-butoxyethyl butyl carbonate, 2-butoxyethyl ethyl carbonate, 2-ethoxyethyl propyl carbonate, 2-ethoxyethyl phenyl carbonate, and 2-ethoxyethyl p-methylphenyl carbonate. Among these, 2-ethoxyethyl methyl carbonate, 2-ethoxyethyl ethyl carbonate, 2-propoxyethyl ethyl carbonate, 2-butoxyethyl ethyl carbonate, 2-ethoxyethyl phenyl carbonate, and 2-ethoxyethyl p-methylphenyl carbonate are particularly preferable. The compounds represented by the general formula (1) may be used either alone or in combination, and the compounds represented by the general formula (2) may be used either alone or in combination.

The solid catalyst component (I) may include an electron donor compound (hereinafter may be referred to as "component (B)", "electron donor compound (B)", or "compound (B)") other than the component (A) represented by the general formula (1). The component (B) may be an alcohol, a phenol, an acid halide, an acid amide, a nitrile, an acid anhydride, an ether compound, an organic acid ester, a silicic acid ester, a compound that includes an ether group and an ester group, or the like.

Examples of the component (B) include an alcohol such as ethanol, butyl alcohol, 2-ethylhexyl alcohol, and 1,3-butanediol, a phenol such as phenol, cresol, 2,6-dibutylphenol, 1-naphthol, catechol, and 3,5-dibutylcatechol, an acid halide such as benzoic chloride, phthalate dichloride, and acetyl chloride, a nitrile such as butyramide, phenylamide, phthalic acid diamide, acetonitrile, cyanobenzene, and 2-cyanobenzoic acid ester, an acid anhydride such as phthalic anhydride and acetic anhydride, an ether such as dibutyl ether, diphenyl ether, 1,3-dimethoxy-2,2-diisobutylpropane, and 9,9-dimethoxyfluorene, an organic acid ester such as a monocarboxylic ester such as a benzoic acid ester, an isobutyric acid ester, and a norbornylcarboxylic ester, an aliphatic dicarboxylic diester such as a malonic diester, a succinic diester, a maleic diester, and a glutaric diester, and an alicyclic dicarboxylic diester such as a cycloalkanedicarboxylic diester and a cycloalkenedicarboxylic diester, a silicic acid ester such as tetraethoxysilane, dicyclopentyldimethoxysilane, tetraphenoxysilane, and methyltriphenoxysilane, a compound that includes an ester group and an ether group, such as cellosolve acetate, cellosolve benzoate, and a p-ethoxyethylbenzoic ester, and the like.

The component (B) is preferably a malonic diester (e.g., dimethyl malonate and diethyl malonate), a hydrocarbon-substituted malonic diester (e.g., dimethyl diisobutylmalonate, diethyl diisobutylmalonate, and diethyl benzylidenemalonate), a maleic diester (e.g., diethyl maleate and di-n-butyl maleate), or a cycloalkanedicarboxylic diester (e.g., dimethyl cyclohexane-1,2-dicarboxylate and 1,1-norbornyldicarboxylic diester). These components (B) may be used in combination.

The solid catalyst component (I) may include a polysiloxane (hereinafter may be referred to as "component (F)"). The stereoregularity or the crystallinity of the resulting polymer can be improved, and production of a fine powder can be reduced by utilizing the polysiloxane. The term "polysiloxane" refers to a polymer that includes a siloxane linkage (—Si—O—) in the main chain, and is also referred to as "silicone oil". The polysiloxane may be a chain-like, partially hydrogenated, cyclic, or modified polysiloxane that is liquid or viscous at room temperature, and has a viscosity at 25° C. of 0.02 to 100 cm$^2$/s (2 to 10,000 cSt), and preferably 0.03 to 5 cm$^2$/s (3 to 500 cSt).

Examples of the chain-like polysiloxane include disiloxanes such as hexamethyldisiloxane, hexaethyldisiloxane, hexapropyldisiloxane, hexaphenyldisiloxane, 1,3-divinyltetramethyldisiloxane, 1,3-dichlorotetramethyldisiloxane, 1,3-dibromotetramethyldisiloxane, chloromethylpentamethyldisiloxane, 1,3-bis(chloromethyl)tetramethyldisiloxane, and for example, polysiloxane except disiloxanes such as dimethylpolysiloxane and methylphenylpolysiloxane. Examples of the partially hydrogenated polysiloxane include methyl hydrogen polysiloxane having a degree of hydrogenation of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include a higher fatty acid group-substituted dimethylsiloxane, an epoxy group-substituted dimethylsiloxane, and a polyoxyalkylene group-substituted dimethylsiloxane. Among these, decamethylcyclopentasiloxane and dimethylpolysiloxane are preferable, and decamethylcyclopentasiloxane is particularly preferable.

The content of titanium, magnesium, the halogen (halogen atoms), and the component (A) in the solid catalyst component (I) is not particularly limited. The content of titanium in the solid catalyst component (I) is 0.1 to 10 wt %, preferably 0.5 to 8.0 wt %, and more preferably 1.0 to 5.0 wt %. The content of magnesium in the solid catalyst component (I) is 10 to 40 wt %, preferably 10 to 30 wt %, and more preferably 13 to 25 wt %. The content of the halogen (halogen atoms) in the solid catalyst component (I) is 20 to 89 wt %, preferably 30 to 85 wt %, and more preferably 40 to 75 wt %. The content of the component (A) (when the component (I) does not include the electron donor compound (B)), or the total content of the component (A) and the electron donor compound (B) (when the component (I) includes the electron donor compound (B)), in the solid catalyst component (I) is 0.5 to 40 wt %, preferably 1 to 30 wt %, and more preferably 2 to 25 wt %. When the component (I) includes the electron donor compound (B), the ratio of the content of the electron donor compound (B) to the content of the component (A) is 0.01 to 50, preferably 0.1 to 10, and more preferably 0.2 to 5 (on a molar basis).

The solid catalyst component (I) may include a reagent that includes silicon, phosphorus, or a metal (e.g., aluminum) in addition to the above components. Examples of the reagent include an organosilicon compound that includes an Si—O—C linkage, an organosilicon compound that includes an Si—N—C linkage, a phosphoric acid compound that includes a P—O linkage, an organoaluminum compound (e.g., trialkylaluminum, dialkoxyaluminum chloride, alkoxyaluminum dihalide, and trialkoxyaluminum), and an aluminum trihalide. Among these, an organosilicon compound that includes an Si—O—C linkage, an organosilicon compound that includes an Si—N—C linkage, and an organoaluminum compound are preferable. When the solid catalyst component (I) includes such a reagent, the polymerization activity of the resulting solid catalyst component, and the stereoregularity of the resulting polymer can be improved.

Examples and specific examples of the organosilicon compound that includes an Si—O—C linkage and the organosilicon compound that includes an Si—N—C linkage include those mentioned later in connection with the organosilicon compound represented by the general formula (3) and the organosilicon compound represented by the general formula (4). Examples of the organoaluminum compound include those mentioned later in connection with the organoaluminum compound represented by the general formula (2). These reagents may be used either alone or in combination.

The solid catalyst component (I) that includes the reagent may further include an organosilicon compound represented by the following general formula (6) that includes an unsaturated alkyl group.

$$[CH_2\!=\!CH\!-\!(CH_2)_u]_t SiR^{13}_{4-t} \qquad (6)$$

wherein $R^{13}$ is a hydrogen atom, an alkyl group having 1 to 20 carbon atoms, a cycloalkyl group, a phenyl group, a vinyl group, or a halogen atom, provided that a plurality of $R^{13}$ are either identical or different when a plurality of $R^{13}$ are present, u is an integer from 0 to 5, and t is an integer from 1 to 4. In this case, the polymerization activity of the resulting solid catalyst component, and the hydrogen response can be further improved.

The term "unsaturated alkyl group" refers to a vinyl group or an alkenyl group. Examples of the organosilicon compound include vinyl group-containing alkylsilanes, vinyl group-containing alkoxysilanes, vinyl group-containing cycloalkylsilanes, vinyl group-containing phenylsilanes, vinyl group-containing halogenated silanes, vinyl group-containing halogenated alkylsilanes, alkenyl group-containing vinylsilanes, alkenyl group-containing alkylsilanes, alkenyl group-containing alkoxysilanes, alkenyl group-containing cycloalkylsilanes, alkenyl group-containing phenylsilanes, alkenyl group-containing halogenated silanes, and alkenyl group-containing halogenated alkylsilanes. The vinyl group is represented by $CH_2\!=\!CH\!-\!$, and the alkenyl group is represented by $CH_2\!=\!CH\!-\!(CH_2)_u\!-\!$. Among these, vinyltrialkylsilanes, allyltrialkylsilanes, divinyldialkylsilanes, diallyldialkylsilanes, trivinylalkylsilanes, and triallylalkylsilanes are preferable, and allyldimethylvinylsilane, diallyldimethylsilane, triallylmethylsilane, di-3-butenydimethylsilane, diallyldichlorosilane, and allyltriethylsilane are particularly preferable. These organosilicon compounds that include an unsaturated alkyl group may be used either alone or in combination.

Method for Producing Solid Catalyst Component (I) for Copolymerization

The solid catalyst component (I) is produced by bringing a magnesium compound (C), a titanium compound (D), an optional halogen compound other than the titanium compound, the compound (A) represented by the general formula (1), and the compound (B) represented by the general formula (2) into contact with each other.

The magnesium compound (C) (hereinafter may be referred to as "component (C)") may be one or more compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like. Among these, a magnesium dihalide, a mixture of a magnesium dihalide and a dialkoxymagnesium, and a dialkoxymagnesium are preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. These dialkoxymagnesiums may be produced by reacting magnesium metal with an alcohol in the presence of a halogen, a halogen-containing metal compound, or the like. These dialkoxymagnesiums may be used either alone or in combination.

It is preferable to use a granular or powdery dialkoxymagnesium when producing the solid catalyst component used in connection with one embodiment of the invention. The dialkoxymagnesium may have an indefinite shape or a spherical shape. For example, when using a spherical dialkoxymagnesium, a polymer powder obtained by polymerization has a better particle shape and a narrow particle size distribution. This improves the handling capability of the polymer powder during polymerization, and eliminates problems such as clogging caused by a fine powder included in the polymer powder.

The spherical dialkoxymagnesium need not necessarily have a perfect spherical shape, but may have an elliptical shape or a potato-like shape. The ratio (1/w) of the major axis diameter 1 to the minor axis diameter w of the spherical dialkoxymagnesium is 3 or less, preferably 1 to 2, and more preferably 1 to 1.5.

The average particle size D50 (i.e., the particle size at 50% in the cumulative volume particle size distribution) of the dialkoxymagnesium measured using a laser diffraction/scattering particle size distribution analyzer is preferably 1 to 200 μm, and more preferably 5 to 150 μm. The average particle size of the spherical dialkoxymagnesium is preferably 1 to 100 μm, more preferably 5 to 50 μm, and still more preferably 10 to 40 μm. It is preferable that the spherical dialkoxymagnesium have a narrow particle size distribution, and have a low fine powder content and a low coarse powder content. More specifically, it is preferable that the spherical dialkoxymagnesium have a content of particles having a particle size (measured using a laser diffraction/scattering particle size distribution analyzer) equal to or less than 5 μm of 20% or less, and more preferably 10% or less. It is preferable that the spherical dialkoxymagnesium have a content of particles having a particle size equal to or more than 100 μm of 10% or less, and more preferably 5% or less.

The particle size distribution ln(D90/D10) (where, D90 is the particle size at 90% in the cumulative volume particle size distribution, and D10 is the particle size at 10% in the cumulative volume particle size distribution) of the spherical dialkoxymagnesium is preferably 3 or less, and more preferably 2 or less. The spherical dialkoxymagnesium may be produced using the method disclosed in JP-A-58-41832, JP-A-62-51633, JP-A-3-74341, JP-A-4-368391, JP-A-8-73388, or the like.

The component (C) may be used in the form of a magnesium compound solution, or may be used in the form of a magnesium compound suspension. When the component (C) is solid, the component (C) is dissolved in a solvent that can dissolve the component (C) to prepare a magnesium compound solution, or suspended in a solvent that cannot dissolve the component (C) to prepare a magnesium compound suspension. When the component (C) is liquid, the component (C) may be used directly as a magnesium compound solution, or may be dissolved in a solvent that can dissolve the component (C) to prepare a magnesium compound solution.

Examples of a compound that can dissolve the solid component (C) include at least one compound selected from the group consisting of an alcohol, an ether, and an ester. Specific examples of the compound that can dissolve the solid component (C) include an alcohol having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, isopropylbenzyl alcohol, and ethylene glycol, a halogen-containing alcohol having 1 to 18 carbon atoms, such as trichloromethanol, trichloroethanol, and trichlorohexanol, an ether having 2 to 20 carbon atoms, such as methyl ether, ethyl ether, isopropyl ether, butyl ether, amyl ether, tetrahydrofuran, ethyl benzyl ether, dibutyl ether, anisole, and diphenyl ether, a metal acid ester such as tetraethoxytitanium, tetra-n-propoxytitanium, tetraisopropoxytitanium, tetrabutoxytitanium, tetrahexoxytitanium, tetrabutoxyzirconium, and tetraethoxyzirconium, and the like. Among these, an alcohol (e.g., ethanol, propanol, butanol, and 2-ethylhexanol) is preferable, and 2-ethylhexanol is particularly preferable.

A saturated hydrocarbon solvent or an unsaturated hydrocarbon solvent that does not dissolve a magnesium compound is used as a medium that cannot dissolve the component (C). The saturated hydrocarbon solvent or the unsaturated hydrocarbon solvent is safe and has high industrial versatility. Examples of the saturated hydrocarbon solvent or the unsaturated hydrocarbon solvent include a linear or branched aliphatic hydrocarbon compound having a boiling point of 50 to 200° C., such as hexane, heptane, decane, and methylheptane, an alicyclic hydrocarbon compound having a boiling point of 50 to 200° C., such as cyclohexane, ethylcyclohexane, and decahydronaphthalene, and an aromatic hydrocarbon compound having a boiling point of 50 to 200° C., such as toluene, xylene, and ethylbenzene. Among these, a linear aliphatic hydrocarbon compound having a boiling point of 50 to 200° C. (e.g., hexane, heptane, and decane), and an aromatic hydrocarbon compound having a boiling point of 50 to 200° C. (e.g., toluene, xylene, and ethylbenzene) are preferable. These solvents may be used either individually or in combination.

Examples of the titanium compound (D) (hereinafter may be referred to as "component (D)") include a tetravalent titanium compound represented by the following general formula (7).

$$Ti(OR^{14})_j X_{4-j} \tag{7}$$

wherein $R^{14}$ is a hydrocarbon group having 1 to 10 carbon atoms, provided that a plurality of $R^{14}$ are either identical or different when a plurality of $OR^{14}$ are present, X is a halogen group, provided that a plurality of X are either identical or different when a plurality of X are present, and j is an integer from 0 to 4.

The tetravalent titanium compound represented by the general formula (7) is one compound, or two or more compounds, selected from an alkoxytitanium, a titanium halide, and an alkoxytitanium halide. Specific examples of the tetravalent titanium compound include titanium tetrahalides such as titanium tetrafluoride, titanium tetrachloride, titanium tetrabromide, and titanium tetraiodide, alkoxytitanium trihalides such as methoxytitanium trichloride, ethoxytitanium trichloride, propoxytitanium trichloride, and n-butoxytitanium trichloride, dialkoxytitanium dihalides such as dimethoxytitanium dichloride, diethoxytitanium dichloride, dipropoxytitanium dichloride, and di-n-butoxytitanium dichloride, and trialkoxytitanium halides such as trimethoxytitanium chloride, triethoxytitanium chloride, tripropoxytitanium chloride, and tri-n-butoxytitanium chloride. Among these, halogen-containing titanium compounds are preferable, titanium tetrahalides such as titanium tetrachloride, titanium tetrabromide, and titanium tetraiodide are more preferable, and titanium tetrachloride is particularly preferable. These titanium compounds may be used either alone or in a combination. The tetravalent titanium compound represented by the general formula (7) may be used in a state in which the tetravalent titanium compound is diluted with a hydrocarbon compound, a halogenated hydrocarbon compound, or the like.

A halogen compound other than the component (D) may optionally be used to produce the solid catalyst component (I). Examples of the halogen compound include a tetravalent halogen-containing silicon compound. Specific examples of the halogen compound include a silane tetrahalide such as tetrachlorosilane (silicon tetrachloride) and tetrabromosilane, and an alkoxy group-containing halogenated silane such as methoxytrichlorosilane, ethoxytrichlorosilane, propoxytrichlorosilane, n-butoxytrichlorosilane, dimethoxydichlorosilane, diethoxydichlorosilane, dipropoxydichlorosilane, di-n-butoxydichlorosilane, trimethoxychlorosilane, triethoxychlorosilane, tripropoxychlorosilane, and tri-n-butoxychlorosilane.

The component (A) used to produce the solid catalyst component (I) is the same as the component (A) included in the solid catalyst component (I), and description thereof is omitted. The electron donor compound (B) other than the component (A) that is optionally used to produce the solid catalyst component (I) is the same as the electron donor compound (B) that is optionally included in the solid catalyst component (I), and description thereof is omitted. A component (F) that is optionally used to produce the solid catalyst component (I) is the same as the component (F) that is optionally included in the solid catalyst component (I), and description thereof is omitted.

The solid catalyst component (I) may preferably be produced by a method that co-grinds a solid magnesium compound that does not have a reducing capability, the component (A), and a titanium halide, a method that brings a magnesium halide compound that includes an alcohol or the like, the component (A), and a titanium halide into contact with each other in the presence of an inert hydrocarbon solvent, a method that brings a dialkoxymagnesium, the component (A), and a titanium halide into contact with each other in the presence of an inert hydrocarbon solvent, a method that brings a magnesium compound having a reducing capability, the component (A), and a titanium halide into contact with each other to precipitate a solid catalyst, or the like.

Specific examples of the method for producing the solid catalyst component (I) for copolymerization are described below. When implementing the following methods (1) to (16), the electron donor compound (B) other than the component (A) may be used in combination with the component (A). The component (A) and the component (B) may be used either simultaneously or successively. The components may be brought into contact with each other in the presence of a reagent (e.g., silicon, phosphorus, or aluminum) and a surfactant.

(1) A magnesium halide is dissolved in an alkoxytitanium compound, and an organosilicon compound is brought into contact with the solution to obtain a solid product. The solid product is reacted with a titanium halide, and the component (A) is reacted with the resulting product (or the component (A) and the component (B) are reacted with the resulting product either simultaneously or successively) to produce the solid catalyst component (I). In this case, the component (I) may be subjected to preliminary polymerization using an organoaluminum compound, an organosilicon compound, and an olefin.

(2) A magnesium halide and an alcohol are reacted to obtain a homogeneous solution, and a carboxylic anhydride is brought into contact with the homogeneous solution. A titanium halide, the component (A), and the component (B) (optional) are brought into contact with (reacted with) the solution to obtain a solid, and a titanium halide is brought into contact with the solid to produce the solid catalyst component (I).

(3) Magnesium metal, butyl chloride, and a dialkyl ether are reacted to synthesize an organomagnesium compound, and an alkoxytitanium is brought into contact with (reacted with) the organomagnesium compound to obtain a solid product. The component (A), the component (B) (optional), and a titanium halide are reacted with the solid product either simultaneously or successively to produce the solid catalyst component (I). In this case, the solid component may be subjected to preliminary polymerization using an organoaluminum compound, an organosilicon compound, and an olefin to produce the solid catalyst component (I).

(4) An organomagnesium compound (e.g., dialkylmagnesium) and an organoaluminum compound are brought into contact with (reacted with) an alcohol in the presence of a hydrocarbon solvent to obtain a homogeneous solution, and a silicon compound (e.g., silicon tetrachloride) is brought into contact with the solution to obtain a solid product. A titanium halide, the component (A), and the component (B) (optional) are brought into contact with (reacted with) the solid product in the presence of an aromatic hydrocarbon solvent, and titanium tetrachloride is brought into contact with the resulting product to produce the solid catalyst component (I).

(5) Magnesium chloride, a tetraalkoxytitanium, and a fatty alcohol are brought into contact with each other (reacted with each other) in the presence of a hydrocarbon solvent to obtain a homogeneous solution, and a titanium halide is brought into contact with the solution. The mixture is then heated to precipitate a solid, and the component (A) and the component (B) (optional) are brought into contact with the solid (either simultaneously or successively). The mixture is then reacted with a titanium halide to produce the solid catalyst component (I). A treatment with the component (B) may optionally be added.

(6) A magnesium metal powder, an alkylmonohalogen compound, and iodine are brought into contact with each other (reacted with each other), and a tetraalkoxytitanium, an acid halide, and a fatty alcohol are brought into contact with (reacted with) the mixture in the presence of a hydrocarbon solvent to obtain a homogeneous solution. After the addition of titanium tetrachloride to the solution, the mixture is heated to precipitate a solid product, and the component (A) and the component (B) (optional) are brought into contact with the solid product (either simultaneously or successively). The mixture is then reacted with titanium tetrachloride to produce the solid catalyst component (I).

(7) A dialkoxymagnesium is suspended in a hydrocarbon solvent, and brought into contact with titanium tetrachloride. The mixture is heated, and brought into contact with the component (A) and the component (B) (optional) (either simultaneously or successively) to obtain a solid product. The solid product is washed with a hydrocarbon solvent, and brought into contact with titanium tetrachloride in the presence of a hydrocarbon solvent to produce the solid catalyst component (I). In this case, the solid component may be heated in the presence or absence of a hydrocarbon solvent. A treatment with the component (B) may optionally be added.

(8) A dialkoxymagnesium is suspended in a hydrocarbon solvent, and brought into contact with (reacted with) a titanium halide, the component (A), and the component (B) (optional) to obtain a solid product. The solid product is washed with an inert organic solvent, and brought into contact with (reacted with) a titanium halide in the presence of a hydrocarbon solvent to produce the solid catalyst component (I). In this case, the solid component and a titanium halide may be brought into contact with each other two or more times.

(9) A dialkoxymagnesium, calcium chloride, and an alkoxy group-containing silicon compound are co-ground. The resulting ground solid is suspended in a hydrocarbon solvent, and brought into contact with (reacted with) a titanium halide, the component (A), and the component (B) (optional). A titanium halide is brought into contact with the mixture to produce the solid catalyst component (I).

(10) A dialkoxymagnesium, the component (A), and the component (B) (optional) are suspended in a hydrocarbon solvent, and brought into contact with (reacted with) a titanium halide to obtain a solid product. The solid product is washed with a hydrocarbon solvent, and brought into contact with a titanium halide in the presence of a hydrocarbon solvent to produce the solid catalyst component (I).

(11) An aliphatic magnesium compound (e.g., magnesium stearate) is brought into contact with (reacted with) a titanium halide, the component (A), and the component (B) (optional). A titanium halide is then brought into contact with the mixture to produce the solid catalyst component (I).

(12) A dialkoxymagnesium is suspended in a hydrocarbon solvent, and brought into contact with a titanium halide. The mixture is heated, and reacted with the component (A) and the component (B) (optional) (either simultaneously or successively) to obtain a solid product. The solid product is washed with a hydrocarbon solvent, and brought into contact with a titanium halide in the presence of a hydrocarbon solvent to produce the solid catalyst component (I), wherein aluminum chloride is added in the suspension/contact step or the contact/reaction step. A treatment with the component (B) may optionally be added.

(13) A dialkoxymagnesium, 2-ethylhexyl alcohol, and carbon dioxide are brought into contact with each other (reacted with each other) in the presence of a hydrocarbon solvent to obtain a homogeneous solution. A titanium halide, the component (A), and the component (B) (optional) are brought into contact with (reacted with) the solution (either simultaneously or successively) to obtain a solid. The solid is dissolved in tetrahydrofuran, and a solid product is precipitated. A titanium halide is brought into contact with (reacted with) the solid product (optionally two or more times) to produce the solid catalyst component (I). A silicon compound (e.g., tetrabutoxysilane) may be used in the contact step, the contact/reaction step, or the dissolution step.

(14) Magnesium chloride, an organic epoxy compound, and a phosphoric acid compound are suspended in a hydrocarbon solvent, and heated to obtain a homogeneous solution. A carboxylic anhydride and a titanium halide are brought into contact with (reacted with) the solution to obtain a solid product. The component (A) and the component (B) (optional) are brought into contact with (reacted with) the solid product (either simultaneously or successively), and the resulting reaction product is washed with a hydrocarbon solvent. A titanium halide is brought into contact with the reaction product in the presence of a hydrocarbon solvent to produce the solid catalyst component (I).

(15) A dialkoxymagnesium, a titanium compound, the component (A), and the component (B) (optional) are brought into contact with each other (reacted with each other) in the presence of a hydrocarbon solvent, and a silicon compound (e.g., polysiloxane) is brought into contact with (reacted with) the resulting reaction product. A titanium halide and a metal salt of an organic acid are sequentially brought into contact with (reacted with) the mixture, and a titanium halide is brought into contact with the mixture to produce the solid catalyst component (I).

(16) A dialkoxymagnesium, the component (A), and the component (B) (optional) are suspended in a hydrocarbon solvent. The suspension is heated, and brought into contact with a silicon halide. The mixture is brought into contact with a titanium halide to obtain a solid product. The solid product is washed with a hydrocarbon solvent, and brought into contact with a titanium halide in the presence of a hydrocarbon solvent to produce the solid catalyst component (I). In this case, the solid component may be heated in the presence or absence of a hydrocarbon solvent.

In order to further improve olefin polymerization activity and the stereoregularity of the resulting polymer, a titanium halide and a hydrocarbon solvent may be brought into contact with the solid catalyst component (I) (that has been washed) at 20 to 100° C., and the mixture may be heated to effect a reaction (secondary reaction), and washed with an inert organic solvent that is liquid at room temperature when implementing the methods (1) to (16). The above operation may be repeated 1 to 10 times.

The component (I) may suitably be produced using any of the methods (1) to (16). It is preferable to produce the component (I) using the method (1), (3), (4), (5), (7), (8), or (10), and particularly preferably the method (3), (4), (7), (8), or (10), since a solid catalyst component that ensures high stereoregularity can be obtained. It is most preferable to produce the solid catalyst component (I) by suspending a dialkoxymagnesium and the component (A) (or the component (B)) in a hydrocarbon solvent selected from a linear hydrocarbon, a branched aliphatic hydrocarbon, an alicyclic hydrocarbon, and an aromatic hydrocarbon, adding the suspension to a titanium halide to effect a reaction to obtain a solid product, washing the solid product with a hydrocarbon solvent, and bringing the component (B) (or the component (A)) into contact with the solid product in the presence of a hydrocarbon solvent.

It is also preferable to bring the solid catalyst component (I) obtained by the above method into contact with the organosilicon compound that includes an Si—O—C linkage, the organosilicon compound that includes an Si—N—C linkage, the organoaluminum compound (optional), and the organosilicon compound represented by the general formula (6) (optional), from the viewpoint of improving the polymerization activity of the solid catalyst component, and improving the hydrogen response. The solid catalyst component (I) is brought into contact with these compounds in the presence of a hydrocarbon solvent. After bringing the solid catalyst component (I) into contact with each component, the mixture is sufficiently washed with a hydrocarbon solvent to remove unnecessary components. The solid catalyst component (I) may be repeatedly brought into contact with each compound.

The components are brought into contact with each other at −10 to 100° C., preferably 0 to 90° C., and particularly preferably 20 to 80° C. The contact time is 1 minute to 10 hours, preferably 10 minutes to 5 hours, and particularly preferably 30 minutes to 2 hours. The components may be used in an arbitrary ratio as long as the advantageous effects of the invention are not adversely affected. The organosilicon compound that includes an Si—O—C linkage, the organosilicon compound that includes an Si—N—C linkage, and the organosilicon compound represented by the general formula (6) are normally used in an amount of 0.2 to 20 mol, preferably 0.5 to 10 mol, and particularly preferably 1 to 5 mol, per mol of the titanium atoms included in the solid catalyst component (I). The organoaluminum compound is normally used in an amount of 0.5 to 50 mol, preferably 1 to 20 mol, and particularly preferably 1.5 to 10 mol, per mol of the titanium atoms included in the solid catalyst component (I).

It is preferable to remove the solvent from the resulting solid catalyst component (I) so that the weight ratio of the solvent relative to the solid component is ⅓ or less, and preferably ⅙ to ¹⁄₂₀, to obtain a powdery solid component.

The ratio of the components used when producing the solid catalyst component (I) is determined taking account of the production method. For example, the tetravalent titanium halide compound (C) is used in an amount of 0.5 to 100 mol, preferably 0.5 to 50 mol, and more preferably 1 to 10 mol, based on 1 mol of the magnesium compound (B). The component (A) (when the component (I) does not include the electron donor compound (B)), or a combination of the component (A) and the electron donor compound (B) (when the component (I) includes the electron donor compound (B)), is used in an amount of 0.01 to 10 mol, preferably 0.01 to 1 mol, and more preferably 0.02 to 0.6 mol, based on 1 mol of the magnesium compound (B). The solvent is used in an amount of 0.001 to 500 mol, preferably 0.001 to 100 mol, and more preferably 0.005 to 10 mol, based on 1 mol of the magnesium compound (B). The polysiloxane (F) is used in an amount of 0.01 to 100 g, preferably 0.05 to 80 g, and still more preferably 1 to 50 g, based on 1 mol of the magnesium compound (B).

Propylene-Based Block Copolymer Copolymerization Catalyst

A propylene-based block copolymer copolymerization catalyst (hereinafter may be referred to as "copolymerization catalyst") used in connection with one embodiment of the invention includes (I) the solid catalyst component (see above), (II) an organoaluminum compound (hereinafter may be referred to as "component (G)" or "organoaluminum compound (G)"), and (III) an external electron donor compound (hereinafter may be referred to as "component (H)" or "external electron donor compound (H)"). Note that the component (H) may not be used when the solid catalyst component (I) includes the organosilicon compound that includes an Si—O—C linkage, the organosilicon compound that includes an Si—N—C linkage, or the organoaluminum compound (reagent), or when the solid catalyst component that includes the reagent further includes the organosilicon compound represented by the general formula (6). Specifically, the catalyst that includes the solid catalyst component and the organoaluminum compound exhibits excellent polymerization activity, and ensures excellent hydrogen response, even when the component (H) is not used.

The organoaluminum compound (II) is not particularly limited as long as the organoaluminum compound (II) is a compound represented by the general formula (2). Note that $R^3$ is preferably an ethyl group or an isobutyl group, Q is preferably a hydrogen atom, a chlorine atom, a bromine atom, an ethoxy group, or a phenoxy group, and p is preferably 2, 2.5, or 3, and particularly preferably 3.

Specific examples of the organoaluminum compound include trialkylaluminums such as triethylaluminum, triisopropylaluminum, tri-n-butylaluminum, tri-n-hexylaluminum, and triisobutylaluminum, alkylaluminum halides such as diethylaluminum chloride and diethylaluminum bromide, diethylaluminum hydride, and the like. Among these, alkylaluminum halides such as diethylaluminum chloride, and trialkylaluminums such as triethylaluminum, tri-n-butylaluminum, and triisobutylaluminum are preferable, and triethylaluminum and triisobutylaluminum are particularly preferable. These organoaluminum compounds may be used either alone or in combination.

Examples of the external electron donor compound (III) used to produce the copolymerization catalyst used in connection with one embodiment of the invention include an organic compound that includes an oxygen atom or a nitrogen atom. Examples of the organic compound that includes an oxygen atom or a nitrogen atom include an alcohol, a phenol, an ether, an ester, a ketone, an acid halide, an aldehyde, an amine, an amide, a nitrile, an isocyanate, and an organosilicon compound. The external electron donor compound (III) may be an organosilicon compound that includes an Si—O—C linkage, an aminosilane compound that includes an Si—N—C linkage, or the like.

Among these, an ester such as ethyl benzoate, ethyl p-methoxybenzoate, ethyl p-ethoxybenzoate, methyl p-toluate, ethyl p-toluate, methyl anisate, and ethyl anisate, a 1,3-diether, an organosilicon compound that includes an Si—O—C linkage, and an aminosilane compound that includes an Si—N—C linkage are preferable, and an organosilicon compound that includes an Si—O—C linkage, an aminosilane compound that includes an Si—N—C linkage, and a 2-substituted 1,3-diether are particularly preferable.

Examples of the organosilicon compound that includes an Si—O—C linkage that may be used as the external electron donor compound (III) include an organosilicon compound represented by the following general formula (3).

$$R^4Si(OR^5)_{4-q} \quad (3)$$

wherein $R^4$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group, provided that a plurality of $R^4$ are either identical or different when a plurality of $R^4$ are present, $R^5$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, provided that a plurality of $R^5$ are either identical or different when a plurality of $R^5$ are present, and q is an integer from 0 to 3.

Examples of the aminosilane compound that includes an Si—N—C linkage that may be used as the external electron donor compound (III) include an aminosilane compound represented by the following general formula (4).

wherein $R^6$ and $R^7$ are a hydrogen atom, an alkyl group having 1 to 20 carbon atoms, a vinyl group, an alkenyl group having 3 to 20 carbon atoms, a cycloalkyl group having 3 to 20 carbon atoms, a cycloalkenyl group having 3 to 20 carbon atoms, or an aryl group having 6 to 20 carbon atoms, provided that $R^6$ and $R^7$ are either identical or different, and optionally bond to each other to form a ring, $R^8$ is an alkyl group having 1 to 20 carbon atoms, a vinyl group, an alkenyl group having 3 to 12 carbon atoms, an alkoxy group having 1 to 20 carbon atoms, a vinyloxy group, an alkenyloxy group having 3 to 20 carbon atoms, a cycloalkyl group having 3 to 20 carbon atoms, a cycloalkyloxy group having 3 to 20 carbon atoms, an aryl group having 6 to 20 carbon atoms, or an aryloxy group having 6 to 20 carbon atoms, provided that a plurality of $R^8$ are either identical or different when a plurality of $R^8$ are present, and s is an integer from 1 to 3.

Examples of the organosilicon compound represented by the general formula (3) or (4) include phenylalkoxysilanes, alkylalkoxysilanes, phenylalkylalkoxysilanes, cycloalkylalkoxysilanes, alkyl(cycloalkyl)alkoxysilanes, (alkylamino)alkoxysilanes, alkyl(alkylamino)alkoxysilanes, cycloalkyl(alkylamino)alkoxysilanes, tetraalkoxysilanes, tetrakis(alkylamino)silanes, alkyltris(alkylamino)silanes, dialkylbis(alkylamino)silanes, trialkyl(alkylamino)silanes, and the like. Specific examples of the organosilicon compound represented by the general formula (3) or (4) include n-propyltriethoxysilane, cyclopentyltriethoxysilane, phenyltrimethoxysilane, phenyltriethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimethoxysilane, cyclohexylcyclopentyldimethoxysilane, cyclohexylmethyldimethoxysilane, tetraethoxysilane, tetrabutoxysilane, bis(ethylamino)methylethylsilane, bis(ethylamino)-t-butylmethylsilane, bis(ethylamino)dicyclohexylsilane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, and the like. The external electron donor compound (III) may be one or more compounds selected from n-propyltriethoxysilane, phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroisoquinolino)dimethoxysilane, diethylaminotriethoxysilane, and the like.

The 2-substituted 1,3-diether is selected from a diether compound represented by the following general formula (5).

wherein $R^{10}$ and $R^{11}$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a halogen-substituted aromatic hydrocarbon group having 6 to 12 carbon atoms, a substituted aromatic hydrocarbon group having 7 to 12 carbon atoms, an alkylamino group having 1 to 12 carbon atoms, or a dialkylamino group having 2 to 12 carbon atoms, provided that $R^{10}$ and $R^{11}$ are either identical or different, and optionally bond to each other to form a ring, and $R^9$ and $R^{12}$ are an alkyl group having 1 to 12 carbon atoms, a vinyl group, an alkenyl group having 3 to 12 carbon atoms, a cycloalkyl group having 3 to 6 carbon atoms, an aromatic hydrocarbon group having 6 to 12 carbon atoms, a halogen-substituted aromatic hydrocarbon group having 6 to 12 carbon atoms, or a substituted aromatic hydrocarbon group having 7 to 12 carbon atoms, provided that $R^9$ and $R^{12}$ are either identical or different.

Specific examples of the 2-substituted 1,3-diether include 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 9,9-bis(methoxymethyl)fluorene, and the like. Among these, 2-isopropyl-2-isobutyl-1,3-dimethoxypropane, 2-isopropyl-2-isopentyl-1,3-dimethoxypropane, 9,9-bis(methoxymethyl)fluorene, and the like are preferable. These compounds may be used either alone or in combination.

Method for Copolymerizing Propylene and α-olefin

In one embodiment of the invention, propylene and an α-olefin are copolymerized in the presence of the copolymerization catalyst to produce a propylene-based block copolymer. The α-olefin may be at least one olefin selected from an α-olefin having 2 to 20 carbon atoms (excluding propylene having 3 carbon atoms). Examples of the α-olefin include ethylene, 1-butene, 1-pentene, 4-methyl-1-pentene, vinylcyclohexane, and the like. These α-olefins may be used either alone or in combination. Among these, ethylene and 1-butene are preferable, and ethylene is particularly preferable.

Examples of the copolymerization method used in connection with one embodiment of the invention include a slurry polymerization method that utilizes an inert hydrocarbon solvent such as cyclohexane or heptane, a bulk polymerization method that utilizes a solvent such as liquefied propylene, and a vapor-phase polymerization method that substantially does not utilize a solvent. A block copolymer can be obtained by repeatedly implementing such a polymerization method in a plurality of steps. A combination of the bulk polymerization method and the vapor-phase polymerization method, or a multistep vapor-phase polymerization method is preferable as the copolymerization method.

It is preferable to homopolymerize propylene, or copolymerize propylene and a small amount of α-olefin (particularly ethylene) in the first step, and copolymerize propylene and an α-olefin (particularly ethylene), or copolymerize propylene, ethylene, and 1-butene in the second step. Note that the first step and the second step may respectively be performed a plurality of times.

It is preferable to effect polymerization in the first step while adjusting the polymerization temperature and the polymerization time so that 20 to 90 wt % of the propylene-based block copolymer is obtained. It is preferable to introduce propylene and ethylene or another α-olefin in the second step, and polymerize the components so that the ratio of the rubber part such as an ethylene-propylene rubber (EPR) or an ethylene-propylene-1-butene ternary copolymer is 10 to 80 wt %.

The polymerization temperature in the first step and the second step is 200° C. or less, and preferably 100° C. or less. The polymerization pressure in the first step and the second step is 10 MPa or less, and preferably 5 MPa or less. The polymerization time in each step (the residence time when implementing continuous polymerization) is normally 1 minute to 5 hours. The copolymerization method used in connection with one embodiment of the invention may be implemented using a continuous polymerization method or a batch polymerization method. Each of the first-step polymerization reaction and the second-step polymerization reaction may be implemented in a single step or a plurality of steps. When the first-step polymerization reaction or the second-step polymerization reaction is implemented in a plurality of steps, each step may be implemented under identical conditions or different conditions. It is preferable that the second-step polymerization reaction be a vapor-phase polymerization reaction since elution of EPR from polypropylene (PP) particles can be suppressed.

The catalyst components may be used for copolymerization in an arbitrary ratio as long as the advantageous effects of the invention are not impaired. The organoaluminum compound (G) is normally used in an amount of 1 to 2000 mol, and preferably 50 to 1000 mol, per mol of the titanium atoms included in the solid catalyst component (I). The external electron donor compound (H) is normally used in an amount of 0.002 to 10 mol, preferably 0.01 to 2 mol, and particularly preferably 0.01 to 0.5 mol, per mol of the component (G). The components may be brought into contact with each other in an arbitrary order. It is desirable to add the organoaluminum compound (G) to the polymerization system, and bring the component (I) into contact with the organoaluminum compound (G).

When copolymerizing an olefin using the catalyst that includes the solid catalyst component, the organoaluminum compound, and the external electron donor compound (hereinafter may be referred to as "main polymerization"), it is desirable to effect preliminary polymerization prior to the main polymerization in order to further improve the catalytic activity, the stereoregularity, the particle properties of the resulting polymer, and the like. An olefin that is subjected to the main polymerization, or a monomer such as styrene, may be used for the preliminary polymerization.

The components and the monomer may be brought into contact with each other in an arbitrary order when effecting the preliminary polymerization. Note that it is preferable to add the component (G) to the preliminary polymerization system containing an inert gas atmosphere or an olefin gas atmosphere, bring the solid catalyst component (I) into contact with the component (G), and then bring the olefin (e.g., propylene), or a mixture of propylene and one or more additional olefins, into contact with the above mixture.

When effecting the preliminary polymerization using the component (H), it is desirable to add the component (G) to the preliminary polymerization system containing an inert gas atmosphere or an olefin gas atmosphere, bring the component (H) into contact with the component (G), bring the solid catalyst component (I) into contact with the mixture, and then bring the olefin (e.g., propylene), or a mixture of propylene and one or more additional olefins, into contact with the above mixture.

A large amount of rubber can be incorporated in the resulting block copolymer under identical conditions by utilizing the production method according to one embodiment of the invention that utilizes the above catalyst, and the resulting block copolymer can be applied to a wide range of products. It is also possible to achieve high sustainability of polymerization of the rubber part, and control the properties of the rubber part through multistep polymerization.

Copolymer of Propylene and α-olefin

A block copolymer is normally a polymer that includes segments in which the composition of two or more monomers changes consecutively. Specifically, a block copolymer is normally a polymer in which two or more polymer chains (segments) that differ in polymer primary structure (e.g., type of monomer, type of comonomer, comonomer composition, comonomer content, comonomer sequence, and stereoregularity) are linked within one molecular chain. A propylene-based block copolymer obtained using the method according to one embodiment of the invention is characterized in that polymers that differ in monomer composition are produced by multistep polymerization. Specifically, the main part of the propylene-based block copolymer has a structure in which two or more polymers that differ in monomer composition are present in each polymer particle in a mixed state (some of the polymers are linked through the polymer chain).

The propylene-based block copolymer obtained using the method according to one embodiment of the invention exhibits moderate rigidity due to the presence of crystalline polypropylene, or a crystalline polypropylene-based random copolymer that includes crystalline polypropylene and a small amount of α-olefin (e.g., ethylene) (crystalline PP or homopolymerization part), and exhibits excellent impact resistance due to the presence of a random copolymer (e.g., ethylene-propylene rubber (EPR or rubber part)) obtained by second-step polymerization. The balance between rigidity and impact resistance varies depending on the ratio of crystalline PP and the rubber part. The propylene-based block copolymer obtained by the method according to one embodiment of the invention includes the rubber part in a high ratio since the polymerization activity (block ratio) of the rubber part obtained by second-step polymerization is high. Since a large amount of α-olefin (e.g., ethylene) is introduced into the random copolymer, the copolymer exhibits relatively high rigidity with respect to the amount of rubber part and the ethylene content in the crystalline part. The copolymer exhibits high impact strength with respect to a polymer that includes an identical rubber part.

EXAMPLES

The invention is further described below by way of examples. Note that the following examples are for illustration purposes only, and the invention is not limited to the following examples. In the examples and comparative examples, the sphericity of the dialkoxymagnesium particles, and the content of magnesium atoms, titanium atoms, halogen atoms, and the internal electron donor compound in the solid catalyst component were measured as described below.

Sphericity of Dialkoxymagnesium Particles

The sphericity of the dialkoxymagnesium particles was determined by photographing the dialkoxymagnesium particles using a scanning electron microscope ("JSM-7500F" manufactured by JEOL Ltd.) at a magnification at which 500 to 1000 dialkoxymagnesium particles were displayed on a screen, randomly sampling 500 or more dialkoxymagnesium particles from the photographed dialkoxymagnesium particles, determining the area S and the circumferential length L of each dialkoxymagnesium particle using image analysis software ("MacView Ver. 4.0" manufactured by MOUN-TECH Co., Ltd.), calculating the sphericity of each dialkoxymagnesium particle using the following expression, and calculating the arithmetic mean value thereof.

Sphericity of each dialkoxymagnesium particle=$4\pi \times S \div L^2$

Content of Magnesium Atoms in Solid Catalyst Component

The solid catalyst component from which the solvent component had been completely removed by heating (drying) under reduced pressure was weighed, and dissolved in a hydrochloric acid solution. After the addition of methyl orange (indicator) and a saturated ammonium chloride solution, the mixture was neutralized with aqueous ammonia, heated, cooled, and filtered to remove a precipitate (titanium hydroxide). A given amount of the filtrate was isolated preparatively, and heated. After the addition of a buffer and an EBT mixed indicator, magnesium atoms were titrated using an EDTA solution to determine the content of magnesium atoms in the solid catalyst component (EDTA titration method).

Content of Titanium Atoms in Solid Catalyst Component

The content of titanium atoms in the solid catalyst component was determined in accordance with the method (redox titration) specified in JIS M 8311-1997 ("Method for determination of titanium in titanium ores").

Content of Halogen Atoms in Solid Catalyst Component

The solid catalyst component from which the solvent component had been completely removed by heating (drying) under reduced pressure was weighed, and treated with a mixture of sulfuric acid and purified water to obtain an aqueous solution. A given amount of the aqueous solution was isolated preparatively, and halogen atoms were titrated with a silver nitrate standard solution using an automatic titration device ("COM-1500" manufactured by Hiranuma Sangyo Co., Ltd.) to determine the content of halogen atoms in the solid catalyst component (silver nitrate titration method).

Content of Internal Electron Donor Compound in Solid Catalyst Component

The content of the internal electron donor compound (first internal electron donor compound, second internal electron donor compound, and third internal electron donor compound) in the solid catalyst component was determined using a gas chromatograph ("GC-14B" manufactured by Shimadzu Corporation) under the following conditions. The number of moles of each component (each internal electron donor compound) was calculated from the gas chromatography measurement results using a calibration curve that was drawn in advance using the measurement results at a known concentration.

Measurement Conditions

Column: packed column (2.6 (diameter)×2.1 m, Silicone SE-30 10%, Chromosorb WAW DMCS 80/100, manufactured by GL Sciences Ltd.)

Detector: flame ionization detector (FID)

Carrier gas: helium, flow rate: 40 ml/min

Measurement temperature: vaporization chamber: 280° C., column: 225° C., detector: 280° C., or vaporization chamber: 265° C., column: 180° C., detector: 265° C.

Production Example 1

Synthesis of 2-ethoxyethyl-1-phenyl carbonate 50 g of phenyl chloroformate and 33 ml of 2-ethoxyethanol were dissolved in 300 ml of dichloromethane. After cooling the solution to 0° C. using ice water, 48 ml of triethylamine was added dropwise to the solution over 30 minutes. After the dropwise addition, the mixture was slowly heated to room temperature over 1 hour, and reacted for 12 hours. After completion of the reaction, the reaction product was purified by column separation and distillation to obtain 21 g of a product.

The product was subjected to $^1$H-NMR analysis, and it was found that the $^1$H-NMR chemical shift values were 1.25 (t, 3H), 3.58 (q, 2H), 3.73 (m, 2H), 4.40 (t, 2H), 7.17-7.41 (m, 5H). It was thus confirmed that the product was 2-ethoxyethyl phenyl carbonate. The purity of the resulting 2-ethoxyethyl-1-phenyl carbonate determined by GC was 96.9%.

Production Example 2

Synthesis of 2-ethoxyethyl-1-ethyl carbonate 54 ml of pyridine and 30 g of 2-ethoxyethanol were dissolved in 500 ml of dichloromethane. After cooling the solution to 0° C. using ice water, 54 g of ethyl chloroformate was added dropwise to the solution over 30 minutes. After the dropwise addition, the mixture was slowly heated to room temperature over 1 hour, and reacted for 16 hours. After completion of the reaction, the reaction product was purified by column separation and distillation to obtain 53 g of a product.

The product was subjected to $^1$H-NMR analysis, and it was found that the $^1$H-NMR chemical shift values were 1.14 (t, 3H), 1.23 (t, 3H), 3.46 (q, 2H), 3.56-3.62 (m, 2H), 4.12 (q, 2H), 4.18-4.23 (m, 2H). It was thus confirmed that the product was 2-ethoxyethyl-1-ethyl carbonate. The purity of the resulting 2-ethoxyethyl-1-ethyl carbonate determined by GC was 98.0%.

Production Example 3

Synthesis of 2-ethoxyethyl-1-methyl carbonate 100 g of 2-ethoxyethanol was added dropwise to a mixture of 700 g of dimethyl carbonate and 230 g of potassium carbonate at 25° C. in a nitrogen atmosphere. The mixture was stirred for 16 hours, and filtered. The filtrate was concentrated, and purified by vacuum distillation to obtain 74 g of a product.

The product was subjected to $^1$H-NMR analysis, and it was found that the $^1$H-NMR chemical shift values were 1.16 (t, 3H), 3.49 (q, 2H), 3.60-3.63 (m, 2H), 3.74 (s, 3H), 4.22-4.27 (m, 2H). It was thus confirmed that the product was 2-ethoxyethyl-1-methyl carbonate. The purity of the resulting 2-ethoxyethyl-1-methyl carbonate determined by GC was 99.0%.

Production Example 4

Synthesis of 2-methoxyethyl-1-methyl carbonate 100 g of 2-methoxyethanol was added dropwise to a mixture of 830 g of dimethyl carbonate and 270 g of potassium carbonate at 25° C. in a nitrogen atmosphere. The mixture was stirred for 16 hours, and filtered. The filtrate was concentrated, and purified by vacuum distillation to obtain 61 g of a product.

The product was subjected to $^1$H-NMR analysis, and it was found that the $^1$H-NMR chemical shift values were 3.34 (s, 3H), 3.55-3.60 (m, 2H), 3.74 (s, 3H), 4.22-4.26 (m, 2H).

It was thus confirmed that the product was 2-methoxyethyl-1-methyl carbonate. The purity of the resulting 2-methoxyethyl-1-methyl carbonate determined by GC was 99.0%.

Production Example 5

Synthesis of 2-ethoxyethyl-1-(p-methylphenyl) carbonate 62.7 g of pyridine was added to a solution of 29 g of 2-ethoxyethanol in 1000 ml of dichloromethane at 0° C. 45 g of p-tolylchloroformic acid was then added dropwise to the mixture at 0° C. After stirring the mixture at 20° C. for 16 hours, the reaction was terminated by adding water, and the organic layer was extracted with dichloromethane. The extract was washed with salt water and a sodium hydrogen carbonate aqueous solution, concentrated, and purified by vacuum distillation to obtain 41 g of a product.

The product was subjected to $^1$H-NMR analysis, and it was found that the $^1$H-NMR chemical shift values were 1.27 (t, 3H), 2.37 (s, 3H), 3.60 (q, 2H), 3.72-3.76 (m, 2H), 4.38-4.43 (m, 2H), 7.06-7.10 (m, 2H), 7.19 (d, 2H). It was thus confirmed that the product was 2-ethoxyethyl-1-(p-methylphenyl) carbonate. The purity of the resulting 2-ethoxyethyl-1-(p-methylphenyl) carbonate determined by GC was 98%.

Example 1

Synthesis of Solid Catalyst Component (A1)

A flask (internal volume: 500 ml) equipped with a stirrer in which the internal atmosphere had been sufficiently replaced with nitrogen gas, was charged with 10 g (87.4 mmol) of spherical diethoxymagnesium (sphericity: 1.10) and 55 ml of toluene to prepare a suspension. After the addition of 30 ml of titanium tetrachloride and 3.21 g (15.3 mmol) of 2-ethoxyethyl-1-phenyl carbonate to the suspension, the mixture was heated to 90° C. The mixture was reacted at 90° C. for 90 minutes. After completion of the reaction, the supernatant liquid was removed. After the addition of 20 ml of TiCl$_4$, the mixture was reacted at 100° C. for 2 hours. After completion of the reaction, the resulting reaction product was washed four times with 75 ml of toluene (100° C.). The mixture was then washed six times with 75 ml of n-heptane (40° C.) to obtain a solid catalyst component (A1). The titanium content in the solid catalyst component was measured after solid-liquid separation, and found to be 3.2 wt %.

Synthesis of Polymerization Catalyst (B1)

An autoclave (internal volume: 2.0 l) equipped with a stirrer in which the internal atmosphere had been completely replaced with nitrogen gas, was charged with 2.4 mmol of triethylaluminum, 0.24 mmol of dicyclopentyldimethoxysilane (DCPDMS), and the solid catalyst component (A1) (0.003 mmol on a titanium atom basis) to prepare an ethylene-propylene copolymerization catalyst (B 1).

Production of Propylene-Based Block Copolymer

An autoclave equipped with a stirrer was charged with 10.2 mg of the ethylene-propylene copolymerization catalyst (B1), liquefied propylene (15 mol), and hydrogen gas (partial pressure: 0.20 MPa). After effecting preliminary polymerization at 20° C. for 5 minutes, first-step propylene homopolymerization (homopolymerization step) was effected at 70° C. for 75 minutes. After completion of homopolymerization, the monomer was purged while lowering the temperature of the autoclave to room temperature. The weight of the entire autoclave was measured, and the first-step polymerization amount was calculated from the difference between the measured weight and the weight measured before polymerization. The polymer was sampled in a nitrogen atmosphere for measuring the MFR. After connecting a monomer feed line and the like, ethylene, propylene, and hydrogen were fed to the autoclave in a molar ratio of 1.0/1.0/0.043. The mixture was heated to 70° C., and polymerized at 70° C. for 1 hour under a pressure of 1.2 MPa while feeding ethylene, propylene, and hydrogen in a ratio of 2/2/0.086 (1/min) to obtain a propylene-based block copolymer.

The propylene-based block copolymerization activity (ICP (impact copolymer) activity) (g-ICP/(g-cat)) and the polymerization ratio (block ratio) (wt %) of the copolymerization part were measured as described below to evaluate the sustainability of polymerization activity. The MFR of the homopolymer, the MFR of the ICP, the EPR content (rubber content) (wt %) in the propylene-based block copolymer, the ethylene content (wt %) in the EPR, the ethylene content (wt %) in the xylene-insoluble component, the flexural modulus (FM) (MPa), and the Izod impact strength (KJ/m$^2$) were also measured. The results are shown in Table 1.

ICP Polymerization Activity

The propylene-based block copolymerization activity per gram of the solid catalyst component was calculated by the following expression.

Propylene-based block copolymerization activity
(g-ICP/g-catalyst)=(I(g)−F(g)+J(g))/[{mass(g)of
solid catalyst component in olefin polymerization catalyst×((G(g)−F(g)−J(g))}/(G(g)−F(g)))]

Note that I is the mass (g) of the autoclave after completion of copolymerization, F is the mass (g) of the autoclave, G is the mass (g) of the autoclave after unreacted monomers had been removed after completion of PP homopolymerization, and J is the amount (g) of polymer removed after homopolymerization.

Block Ratio (Mass %)

Block ratio(mass %)={(I(g)−G(g)+J(g))/(I(g)−F(g))}×100

Note that I is the mass (g) of the autoclave after completion of copolymerization, G is the mass (g) of the autoclave after unreacted monomers had been removed after completion of PP homopolymerization, J is the amount (g) of polymer removed after homopolymerization, and F is the mass (g) of the autoclave.

EPR Content (Xylene-Soluble Content in ICP Polymer)

A flask equipped with a stirrer was charged with 5.0 g of the copolymer (ICP propylene polymer) and 250 ml of p-xylene. The external temperature was increased to be equal to or higher than the boiling point of xylene (about 150° C.), and the polymer was dissolved over 2 hours while maintaining p-xylene contained in the flask at the boiling point (137 to 138° C.). The solution was cooled to 23° C. over 1 hour, and an insoluble component and a soluble component were separated by filtration. A solution of the soluble component was collected, and p-xylene was evaporated by heating (drying) under reduced pressure. The weight of the residue was calculated, and the relative ratio (mass %) relative to the polymer (propylene-based block copolymer) was calculated to determine the EPR content.

Determination of Ethylene Content in EPR

A small amount of EPR (xylene-soluble component) that was extracted with xylene when determining the EPR content (xylene-soluble content in the ICP polymer) was sampled, and hot-pressed in the shape of a film. The ethylene content in the EPR was calculated from the absorbance measured using a Fourier transform infrared spectrometer (FT-IR) ("Avatar" manufactured by Thermo Nicolet) based on a calibration curve drawn using a plurality of samples having a known ethylene content.

Measurement wavelength: 720 cm$^{-1}$ and 1150 cm$^{-1}$
Film thickness: 0.1 to 0.2 mm Ethylene Content in Xylene-Insoluble Component A small amount of the xylene-insoluble component obtained by extraction with xylene was sampled, and hot-pressed in the shape of a film, and the ethylene content in the xylene-insoluble component was calculated in the same manner as the ethylene content in the EPR.

Melt Flow Rate (MFR) of Polymer

The melt flow rate (MFR) (melt flow index) (g/10 min) of homopolypropylene and the ICP polymer was measured in accordance with ASTM D1238 (JIS K 7210).

Flexural Modulus (FM) of Polymer

The polymer was molded to prepare a property measurement specimen in accordance with JIS K 7171. The specimen was conditioned in a temperature-controlled room maintained at 23° C. for 144 hours or more, and the flexural modulus (FM) (MPa) was measured using the specimen provided that a liquid/powder exudate was not observed on the surface thereof. Note that the property measurement specimen was prepared as described below. 10 wt % of IRGANOX 1010 (manufactured by BASF), 0.10 wt % of IRGAFOS 168 (manufactured by BASF), and 0.08 wt % of calcium stearate were added to the ethylene-propylene copolymer, and the mixture was kneaded and granulated using a single-screw extruder to obtain pellets of the ethylene-propylene copolymer. The pellets of the ethylene-propylene copolymer were introduced into an injection molding machine (mold temperature: 60° C., cylinder temperature: 230° C.), and injection-molded to prepare the property measurement specimen.

Izod Impact Strength 0.10 wt % of IRGANOX 1010 (manufactured by BASF), 0.10 wt % of IRGAFOS 168 (manufactured by BASF), and 0.08 wt % of calcium stearate were added to the ethylene-propylene copolymer, and the mixture was kneaded and granulated using a single-screw extruder to obtain pellets of the ethylene-propylene copolymer. The pellets of the ethylene-propylene copolymer were introduced into an injection molding machine (mold temperature: 60° C., cylinder temperature: 230° C.), and injection-molded to prepare a property measurement specimen. The specimen was conditioned in a temperature-controlled room maintained at 23° C. for 144 hours or more, and the Izod impact strength of the specimen was measured in accordance with JIS K 7110 ("Method of Izod Impact Test For Rigid Plastics") using an Izod tester ("Model A-121804405" manufactured by Toyo Seiki Seisaku-Sho, Ltd.). Shape of specimen: ISO 180/4A, thickness: 3.2 mm, width: 12.7 mm, length: 63.5 mm Shape of notch: type-A notch (radius: 0.25 mm) formed using a die provided with a notch Temperature: 23° C. and −30° C.
Impact speed: 3.5 m/s
Nominal pendulum energy: 5.5 J (23° C.) and 2.75 J (−30° C.)

Example 2

Preparation of Polymerization Catalyst (B2) and Production of Propylene-Based Block Copolymer A polymerization catalyst (B2) was prepared, and polymerization was effected (evaluated) in the same manner as in Example 1, except that 0.24 mmol of diisopropyldimethoxysilane (DIPDMS) was used instead of 0.24 mmol of dicyclopentyldimethoxysilane (DCPDMS). The polymerization results are shown in Table 1.

Example 3

Synthesis of Solid Catalyst Component (A3)

A solid catalyst component (A3) was produced in the same manner as in Example 1, except that 2-ethoxyethyl-1-ethyl carbonate obtained in Production Example 2 was used instead 2-ethoxyethyl-1-phenyl carbonate in an equimolar amount. The titanium content in the resulting solid catalyst component was 1.6 wt %.

Preparation of Polymerization Catalyst (B3) and Production of Propylene-Based Block Copolymer A polymerization catalyst (B3) was prepared, and polymerization was effected in the same manner as in Example 1, except that the solid catalyst component (A3) was used instead of the solid catalyst component (A1). The polymerization results are shown in Table 1.

Example 4

Production of Solid Catalyst Component (A4)

A 500 ml round-bottom flask in which the internal atmosphere had been sufficiently replaced with nitrogen, was charged with 120 ml of purified n-heptane. After the addition of 15 g of anhydrous magnesium chloride and 106 ml of tetrabutoxytitanium, the mixture was reacted at 90° C. for 1.5 hours to obtain a homogenous solution. The solution was cooled to 40° C. After the addition of 24 ml of methyl hydrogen polysiloxane (viscosity: 20 cSt) while maintaining the solution at 40° C., the mixture was subjected to a precipitation reaction for 5 hours. A precipitated solid product was sufficiently washed with purified n-heptane. A 500 ml round-bottom flask equipped with a stirrer in which the internal atmosphere had been sufficiently replaced with nitrogen, was charged with 40 g of the solid product, and purified n-heptane was added to the flask so that the concentration of the solid product was 200 mg/ml. After the addition of 12 ml of SiCl$_4$, the mixture was reacted at 90° C. for 3 hours. The reaction product was sufficiently washed with purified n-heptane, and purified n-heptane was added to the flask so that the concentration of the reaction product was 100 mg/ml.

After the addition of 10 mmol of 2-ethoxyethyl-1-phenyl carbonate obtained in Production Example 1, the mixture was reacted at 70° C. for 1 hour. The reaction product was sufficiently washed with purified n-heptane, followed by the addition of 100 ml of purified n-heptane. After the addition of 20 ml of TiCl$_4$, the mixture was reacted at 95° C. for 3 hours. After completion of the reaction, the supernatant liquid was removed. After the addition of 20 ml of TiCl$_4$, the mixture was reacted at 100° C. for 2 hours. The reaction product was sufficiently washed with purified n-heptane. The resulting solid product was dried under reduced pressure to obtain a powdery solid catalyst component (A4). The titanium content in the solid catalyst component (A4) was 3.4 wt %.

Preparation of Polymerization Catalyst (B4) and Production of Propylene-Based Block Copolymer A polymerization catalyst (B4) was prepared, and polymerization was effected in the same manner as in Example 1, except that the solid catalyst component (A4) was used instead of the solid catalyst component (A1). The titanium content in the solid catalyst component was 2.9 wt %. The polymerization results are shown in Table 1.

Comparative Example 1

Production of Solid Catalyst Component (a1)

A solid catalyst component (a1) was produced in the same manner as in Example 1, except that 15.3 mmol of dibutyl phthalate was used instead of 15.3 mmol of 2-ethoxyethyl-1-phenyl carbonate. The titanium content in the resulting solid catalyst component was 3.7 wt %.

Preparation of Polymerization Catalyst (b1) and Production of Propylene-Based Block Copolymer A polymerization catalyst (b 1) was prepared, and polymerization was effected in the same manner as in Example 1, except that the solid catalyst component (a1) was used instead of the solid catalyst component (A1). The polymerization results are shown in Table 1.

Comparative Example 2

Production of Solid Catalyst Component (a2)

A solid catalyst component (a2) was produced in the same manner as in Example 1, except that 2-isopropyl-2-isopentyl-1,3-dimethoxypropane was used instead 2-ethoxyethyl-1-phenyl carbonate in an equimolar amount. The titanium content in the resulting solid catalyst component was 2.5 wt %.

Preparation of Polymerization Catalyst (b2) and Production of Propylene-Based Block Copolymer A polymerization catalyst (b2) was prepared, and polymerization was effected in the same manner as in Example 1, except that the solid catalyst component (a2) was used instead of the solid catalyst component (A1). The polymerization results are shown in Table 1.

Example 5

Production of Solid Catalyst Component (A5)

A solid catalyst component (A5) was produced in the same manner as in Example 1, except that 2-ethoxyethyl-1-methyl carbonate obtained in Production Example 3 was used instead of 2-ethoxyethyl-1-phenyl carbonate in an equimolar amount. The titanium content in the resulting solid catalyst component was 1.7 wt %.

Preparation of Polymerization Catalyst and Production of Propylene-Based Block Copolymer A polymerization catalyst (B5) was prepared, and polymerization was effected in the same manner as in Example 1, except that the solid catalyst component (A5) was used instead of the solid catalyst component (A1). The polymerization results are shown in Table 1.

Example 6

Production of Solid Catalyst Component (A6)

A solid catalyst component (A6) was produced in the same manner as in Example 1, except that 2-methoxyethyl-1-methyl carbonate obtained in Production Example 4 was used instead of 2-ethoxyethyl-1-phenyl carbonate in an equimolar amount. The titanium content in the resulting solid catalyst component was 1.5 wt %.

Preparation of Polymerization Catalyst (B6) and Production of Propylene-Based Block Copolymer A polymerization catalyst (B6) was prepared, and polymerization was effected in the same manner as in Example 1, except that the solid catalyst component (A6) was used instead of the solid catalyst component (A1). The polymerization results are shown in Table 1.

Example 7

Production of Solid Catalyst Component (A7)

A solid catalyst component (A7) was produced in the same manner as in Example 1, except that 2-ethoxyethyl-1-(p-methylphenyl) carbonate obtained in Production Example 5 was used instead of 2-ethoxyethyl-1-phenyl carbonate in an equimolar amount. The titanium content in the resulting solid catalyst component was 2.7 wt %.

Preparation of Polymerization Catalyst (B7) and Production of Propylene-Based Block Copolymer A polymerization catalyst (B7) was prepared, and polymerization was effected in the same manner as in Example 1, except that the solid catalyst component (A7) was used instead of the solid catalyst component (A1). The polymerization results are shown in Table 1.

Example 8

Production of Solid Catalyst Component (A8)

A flask (internal volume: 200 ml) equipped with a stirrer in which the internal atmosphere had been sufficiently replaced with nitrogen gas, was charged with 5.6 g of the solid catalyst component obtained in Example 1 and 70 ml of heptane to prepare a suspension. The suspension was heated to 30° C. 6 mmol of divinyldimethylsilane, 18 mmol of triethylaluminum, and 6 mmol of dicyclopentyldimethoxysilane were sequentially added to the suspension with stirring. After the addition of 15 ml of heptane, the mixture was reacted at 30° C. for 2 hours. After completion of the reaction, the supernatant liquid was removed by decantation. The solid component contained in the flask was washed three times with 150 ml of heptane (30° C.) to obtain a solid catalyst component (A8). The titanium content in the solid catalyst component was 2.0 wt %.

Preparation of Polymerization Catalyst (B8) and Production of Propylene-Based Block Copolymer A polymerization catalyst (B8) was prepared, and polymerization was effected in the same manner as in Example 1, except that the solid catalyst component (A8) was used instead of the solid catalyst component (A1), and 0.24 mmol of dicyclopentyldimethoxysilane (DCPDMS) was not added. Specifically, the polymerization catalyst included the solid catalyst component (A8) and triethylaluminum. The polymerization results are shown in Table 1.

Example 9

Synthesis of Solid Catalyst Component (A9)

A flask (internal volume: 500 ml) equipped with a stirrer in which the internal atmosphere had been sufficiently replaced with nitrogen gas, was charged with 10 g (87.4 mmol) of diethoxymagnesium, 55 ml of toluene, 30 ml of titanium tetrachloride, and 3.8 g (15.3 mmol) of diethyl diisobutylmalonate. The mixture was heated to 100° C. The mixture was then reacted at 100° C. for 90 minutes. After completion of the reaction, the resulting reaction product was washed four times with 75 ml of toluene (100° C.). After the addition of 100 ml of a 10 vol % toluene solution of titanium tetrachloride and 2.64 mmol of 2-ethoxyethyl-1-methyl carbonate, the mixture was heated to 100° C., and reacted for 15 minutes with stirring. After completion of the reaction, the resulting product was washed once with toluene (100° C.). After repeating this operation twice, the mixture was washed six times with 75 ml of n-heptane (40° C.) to obtain a solid catalyst component (A9). The solid catalyst component (A9) was subjected to solid-liquid separation, and the titanium content, the diethyl diisobutylmalonate content, and the 2-ethoxyethyl-1-metyl carbonate content in the solid were measured, and found to be 1.7 wt %, 7.7 wt %, and 3.7 wt %, respectively.

Preparation of Polymerization Catalyst (B9) and Production of Propylene-Based Block Copolymer A polymerization catalyst (B9) was prepared, and polymerization was effected (evaluated) in the same manner as in Example 1, except that the solid catalyst component (A9) was used instead of the solid catalyst component (A1). The polymerization results are shown in Table 1.

Example 10

Synthesis of Solid Catalyst Component (A10)

A flask (internal volume: 500 ml) equipped with a stirrer in which the internal atmosphere had been sufficiently replaced with nitrogen gas, was charged with 10 g (87.4 mmol) of diethoxymagnesium, 55 ml of toluene, 30 ml of titanium tetrachloride, and 15.3 mmol of diethyl benzylidenemalonate, and 2.2 mmol of 2-ethoxyethyl p-methylphenyl carbonate. The mixture was heated to 100° C. The mixture was then reacted at 100° C. for 90 minutes. After completion of the reaction, the resulting reaction product was washed four times with 75 ml of toluene (100° C.). After the addition of 100 ml of a 10 vol % toluene solution of titanium tetrachloride, the mixture was heated to 100° C., and reacted for 15 minutes with stirring. After completion of the reaction, the resulting product was washed once with toluene (100° C.). After repeating this operation twice, the mixture was washed six times with 75 ml of n-heptane (40° C.) to obtain a solid catalyst component (A10). The solid catalyst component (A10) was subjected to solid-liquid separation, and the titanium content, the diethyl benzylidenemalonate content, and the 2-ethoxyethyl p-methylphenyl carbonate content in the solid were measured, and found to be 2.2 wt %, 9.2 wt %, and 3.1 wt %, respectively.

Preparation of Polymerization Catalyst (B 10) and Production of Propylene-Based Block Copolymer A polymerization catalyst (B 10) was prepared, and polymerization was effected (evaluated) in the same manner as in Example 1, except that the solid catalyst component (A10) was used instead of the solid catalyst component (A1). The polymerization results are shown in Table 1.

Example 11

Preparation of Polymerization Catalyst (B11) and Production of Propylene-Based Block Copolymer A polymerization catalyst (B 11) was prepared, and polymerization was effected (evaluated) in the same manner as in Example 10, except that 0.24 mmol of diisopropyldimethoxysilane (DIPDMS) was used instead of 0.24 mmol of dicyclopentyldimethoxysilane (DCPDMS). The polymerization results are shown in Table 1.

Example 12

Preparation of Polymerization Catalyst

A polymerization catalyst (B 12) was prepared, and polymerization was effected (evaluated) in the same manner as in Example 1, except that 0.24 mmol of diethylaminotriethoxysilane (DEATES) was used instead of 0.24 mmol of dicyclopentyldimethoxysilane (DCPDMS). The polymerization results are shown in Table 1.

Comparative Example 3

A polymerization catalyst (b3) was prepared, and polymerization was effected (evaluated) in the same manner as in Example 1, except that the solid catalyst component (a1) produced in Comparative Example 1 was used instead of the solid catalyst component (A1), and 0.24 mmol of diethylaminotriethoxysilane (DEATES) was used instead of 0.24 mmol of dicyclopentyldimethoxysilane (DCPDMS). The polymerization results are shown in Table 1.

Example 13

Production of Propylene-Based Block Copolymer

After effecting block copolymerization in the same manner as in Example 3, the monomer gas was purged, and the total weight was measured to determine the amount of the ethylene-propylene copolymer produced in the second step. After connecting the monomer line, 10 g of 1-butene was added. After feeding ethylene, propylene, and hydrogen to the autoclave in a molar ratio of 2.0/1.0/0.086, the mixture was heated to 70° C. After adjusting the internal pressure to 1.2 MPa, the mixture was polymerized at 70° C. for 20 minutes under a pressure of 1.2 MPa while feeding ethylene, propylene, and hydrogen in a ratio of 2/1/0.086 (1/min) to obtain a propylene-based block copolymer. The results are shown in Table 1.

Example 14

Production of Propylene-Based Block Copolymer

A reaction was effected in the same manner as in Example 1, except that the polymerization catalyst (B3) prepared in Example 3 was used instead of the polymerization catalyst (B1), and the second-step polymerization time was changed from 1 hour to 2 hours. The results are shown in Table 1.

Example 15

Production of Propylene-Based Block Copolymer

A reaction was effected in the same manner as in Example 1, except that the polymerization catalyst (B3) prepared in Example 3 was used instead of the polymerization catalyst (B 1), and ICP polymerization described below was effected after completion of homopolymerization. The results are shown in Table 1. ICP polymerization After completion of homopolymerization, the monomer was purged while lowering the temperature of the autoclave to room temperature. The weight of the entire autoclave was measured, and the first-step polymerization amount was calculated from the difference between the measured weight and the weight measured before polymerization. The polymer was sampled in a nitrogen atmosphere for measuring the MFR. After connecting a monomer feed line and the like, ethylene, propylene, and hydrogen were fed to the autoclave in a molar ratio of 1.0/1.0/0.043. The mixture was heated to 70° C., polymerized at 70° C. for 30 minutes under a pressure of 1.2 MPa while feeding ethylene, propylene, and hydrogen in a ratio of 2/2/0.086 (1/min), and then polymerized at 70° C. for 30 minutes under a pressure of 1.2 MPa while feeding ethylene, propylene, and hydrogen in a ratio of 2/1/0.04 (1/min) to obtain a propylene-based block copolymer.

TABLE 1

|  | ICP polymerization activity (g-ICP/ g-cat) | MFR of polypropylene (g/10 min) | MFR of ICP polymer (g/10 min) | Block ratio (wt %) | EPR content (wt %) | Ethylene content in EPR (wt %) | Ethylene content in xylene-insoluble component (wt %) | Ethylene content in EPR/total ethylene content | FM (MPa) | Izod impact strength (23° C.) (kJ/m²) | Izod impact strength (−30° C.) (kJ/m²) |
|---|---|---|---|---|---|---|---|---|---|---|---|
| Example 1 | 56400 | 17 | 3.8 | 28.5 | 25.5 | 42.1 | 5.7 | 0.72 | 1180 | NB | 7.4 |
| Example 2 | 65800 | 35 | 5.1 | 29.6 | 26.8 | 41.6 | 5.4 | 0.74 | 1190 | NB | 7.7 |
| Example 3 | 56100 | 15 | 3.1 | 30 | 25.5 | 40.8 | 6.8 | 0.67 | 1210 | NB | 7.4 |
| Example 4 | 46000 | 18 | 4.3 | 27.6 | 24.6 | 41 | 5.4 | 0.71 | 1220 | NB | 6.7 |
| Comparative Example 1 | 74200 | 33 | 13 | 19.1 | 14.5 | 39.6 | 4.6 | 0.59 | 1110 | 11.5 | 4.9 |
| Comparative Example 2 | 24400 | 80 | 34 | 12 | 10.5 | 47 | 3.2 | 0.63 | 1250 | 7.9 | 3.3 |
| Example 5 | 49300 | 28 | 7.5 | 27.8 | 24.3 | 40.2 | 5.3 | 0.71 | 1200 | NB | 6.6 |
| Example 6 | 45800 | 21 | 5 | 29 | 26 | 41.2 | 5.1 | 0.74 | 1100 | NB | 10.5 |
| Example 7 | 53100 | 31 | 5.2 | 30.1 | 26.8 | 40.5 | 5.8 | 0.72 | 1100 | NB | 10.1 |
| Example 8 | 64100 | 45 | 6.4 | 30.5 | 26.5 | 40.7 | 5.5 | 0.73 | 1150 | NB | 9.5 |
| Example 9 | 30800 | 19 | 4 | 28.5 | 24.9 | 41.1 | 5.2 | 0.73 | 1160 | NB | 8.9 |
| Example 10 | 41200 | 14 | 3.7 | 27.9 | 24 | 39.6 | 5.7 | 0.69 | 1150 | NB | 10.2 |
| Example 11 | 39100 | 37 | 7.4 | 28.6 | 25.7 | 40.4 | 6.7 | 0.68 | 1130 | NB | 10.4 |
| Example 12 | 25100 | 250 | 48 | 22.4 | 19.7 | 47.8 | 6.4 | 0.65 | 1330 | 12.5 | 4.9 |
| Comparative Example 3 | 60400 | 150 | 40 | 14.8 | 13.8 | 47.7 | 5.5 | 0.58 | 1180 | 8.5 | 4.2 |
| Example 13 | 63500 | 18 | 4 | 37.5 | 33.1 | 40.5 | 6.7 | 0.75 | 1100 | NB | 8.5 |
| Example 14 | 71300 | 15 | 2.1 | 46.2 | 37.6 | 40.7 | 8.8 | 0.73 | 930 | NB | 12.8 |
| Example 15 | 60500 | 20 | 2.8 | 37.2 | 33.0 | 41 | 6.9 | 0.75 | 1050 | NB | 10.5 |

NB: Breakage did not occur.

Ethylene content in EPR/total ethylene content = EPR content × ethylene content in EPR/(EPR content × ethylene content in EPR + (100-EPR content) × ethylene content in xylene-insoluble component As is clear from the results shown in Table 1, the olefin polymerization catalysts respectively prepared using the solid catalyst components obtained in Examples 1 to 15 achieved high second-step copolymerization activity when implementing multistep copolymerization. A large amount of ethylene was introduced into the propylene-ethylene block copolymer, and excellent sustainability of olefin polymerization was achieved during copolymerization. Since the olefin polymerization catalysts achieved excellent impact copolymer (ICP) copolymerizability, the resulting copolymer had a high block ratio. Moreover, ethylene was efficiently introduced into the rubber part, and a good balance between rigidity and impact strength was achieved. As is clear from the results shown in Table 1, the solid catalyst component produced without using the component (compound) (A) achieved poor sustainability of olefin polymerization activity, and ethylene was introduced into the random copolymer in a low ratio during second-step polymerization, although the total yield of the propylene-ethylene block copolymer was high when implementing multistep copolymerization. Therefore, the second-step copolymerization activity (block ratio), and the rubber part (EPR) content in the resulting copolymer were low. The ethylene content in the rubber part (EPR) relative to the total ethylene content in the copolymer was low, and the balance between rigidity and impact strength was poor.

INDUSTRIAL APPLICABILITY

The embodiments of the invention thus provide a method for producing a propylene-based block copolymer that can achieve polymerization that ensures an excellent copolymer rubber production capability, and can produce a propylene-based block copolymer that exhibits rigidity and impact strength in a well-balanced manner.

The invention claimed is:
1. A method for producing a propylene-based block copolymer, the method comprising:

forming a copolymerization catalyst
contacting propylene and an α-olefin with said copolymerization catalyst
copolymerizing said propylene and said α-olefin by said contacting,
wherein said copolymerization catalyst comprises:
(I) a solid catalyst component that comprises titanium, magnesium, a halogen, and a compound represented by formula (1), $$R^1O-C(=O)-O-Z-OR^2 \tag{1}$$

wherein $R^1$ and $R^2$ are a linear alkyl group having 1 to 20 carbon atoms, a branched alkyl group having 3 to 20 carbon atoms, a vinyl group, a linear or branched alkenyl group having 3 to 20 carbon atoms, a linear halogen-substituted alkyl group having 1 to 20 carbon atoms, a branched halogen-substituted alkyl group having 3 to 20 carbon atoms, a linear halogen-substituted alkenyl group having 2 to 20 carbon atoms, a branched halogen-substituted alkenyl group having 3 to 20 carbon atoms, a cycloalkyl group having 3 to 20 carbon atoms, a cycloalkenyl group having 3 to 20 carbon atoms, a halogen-substituted cycloalkyl group having 3 to 20 carbon atoms, a halogen-substituted cycloalkenyl group having 3 to 20 carbon atoms, an aromatic hydrocarbon group having 6 to 24 carbon atoms, and Z is a bidentate linking group selected from an ethylene group having 2 carbon atoms, a branched alkylene group having 3 to 12 carbon atoms, a vinylene group, a linear or branched alkenylene group having 3 to 12 carbon atoms, a cycloalkylene group having 3 to 12 carbon atoms, or a cycloalkenylene group having 3 to 12 carbon atoms, and the two oxygen atoms bonded to Z are bonded through a carbon chain, and the carbon chain includes two carbon atoms;
(II) an organoaluminum compound represented by formula (2), $$R^3{}_pAlQ_{3-p} \tag{2}$$

wherein $R^3$ is a hydrocarbyl group having 1 to 6 carbon atoms, wherein a plurality of $R^3$ are either identical or different when a plurality of $R^3$ are present, Q is a hydrogen atom, a hydrocarbyloxy group having 1 to 6 carbon atoms, or a halogen atom, and p is a real number that satisfies $0<p\leq 3$; and (III) an electron donor other than the compound represented by formula (1).

2. The method according to claim 1,
wherein the electron donor other than the compound represented by formula (1) is at least one compound selected from the group consisting of an organosilicon compound represented by formula (3) and an aminosilane compound represented by formula (4), $$R^4_q Si(OR^5)_{4-q} \tag{3}$$

wherein $R^4$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group, wherein plurality of $R^4$ are either identical or different when a plurality of $R^4$ are present, $R^5$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, wherein each $R^5$ is either identical or different when a plurality of $R^5$ are present, and q is an integer from 0 to 3, and $$(R^6 R^7 N)_s Si R^8_{4-s} \tag{4}$$

wherein $R^6$ and $R^7$ are a hydrogen atom, an alkyl group having 1 to 20 carbon atoms, a vinyl group, an alkenyl group having 3 to 20 carbon atoms, a cycloalkyl group having 3 to 20 carbon atoms, a cycloalkenyl group having 3 to 20 carbon atoms, or an aryl group having 6 to 20 carbon atoms, wherein $R^6$ and $R^7$ are either identical or different, and optionally bond to each other to form a ring, $R^8$ is an alkyl group having 1 to 20 carbon atoms, a vinyl group, an alkenyl group having 3 to 12 carbon atoms, an alkoxy group having 1 to 20 carbon atoms, a vinyloxy group, an alkenyloxy group having 3 to 20 carbon atoms, a cycloalkyl group having 3 to 20 carbon atoms, a cycloalkyloxy group having 3 to 20 carbon atoms, an aryl group having 6 to 20 carbon atoms, or an aryloxy group having 6 to 20 carbon atoms, wherein a plurality of $R^8$ are either identical or different when a plurality of $R^8$ are present, and s is an integer from 1 to 3.

3. The method according to claim 1,
wherein the electron donor other than the compound represented by formula (1) is phenyltrimethoxysilane, n-butyltrimethoxysilane, cyclopentyltrimethoxysilane, cyclohexyltrimethoxysilane, phenyltriethoxysilane, n-butyltriethoxysilane, cyclopentyltriethoxysilane, cyclohexyltriethoxysilane, t-butylmethyldimethoxysilane, t-butylethyldimethoxysilane, diisopropyldimethoxysilane, diisobutyldimethoxysilane, diisopentyldimethoxysilane, diphenyldimethoxysilane, dicyclopentyldimethoxysilane, cyclohexylmethyldimethoxysilane, cyclohexylcyclopentyldimethoxysilane, tetramethoxysilane, tetraethoxysilane, t-butylmethylbis(ethylamino)silane, dicyclohexylbis(ethylamino)silane, dicyclopentbis(ethylamino)silane, bis(perhydroisoquinolino)dimethoxysilane, diethylaminotrimethoxysilane, or diethylaminotriethoxysilane.

4. The method according to claim 1,
wherein the electron donor other than the compound represented by formula (1) is a 1,3-diether compound represented by formula (5), $$R^9 OCH_2 CR^{10} R^{11} CH_2 OR^{12} \tag{5}$$

wherein $R^{10}$ and $R^{11}$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a halogen-substituted aromatic hydrocarbon group having 6 to 12 carbon atoms, a substituted aromatic hydrocarbon group having 7 to 12 carbon atoms, an alkylamino group having 1 to 12 carbon atoms, or a dialkylamino group having 2 to 12 carbon atoms, wherein $R^{10}$ and $R^{11}$ are either identical or different, and optionally bond to each other to form a ring, and $R^9$ and $R^{12}$ are an alkyl group having 1 to 12 carbon atoms, a vinyl group, an alkenyl group having 3 to 12 carbon atoms, a cycloalkyl group having 3 to 6 carbon atoms, an aromatic hydrocarbon group having 6 to 12 carbon atoms, a halogen-substituted aromatic hydrocarbon group having 6 to 12 carbon atoms, or a substituted aromatic hydrocarbon group having 7 to 12 carbon atoms, wherein $R^9$ and $R^{12}$ are either identical or different.

5. The method according to claim 4,
wherein the 1,3-diether compound is 2-isopropyl-2-isobutyl-1,3-dimethoxypropane, 2-isopropyl-2-isopentyl-1,3-dimethoxypropane, or 9,9-bis(methoxymethyl)fluorene.

6. The method according to claim 1, wherein said copolymerizing comprises:
homopolymerizing propylene and then copolymerizing propylene and ethylene.

7. The method according to claim 6, wherein said copolymerizing propylene and ethylene further comprises copolymerizing with at least one α-olefin other than said propylene and ethylene.

8. The method according to claim 7, wherein said at least one α-olefin other than said propylene and ethylene is 1-butene.

9. The method according to claim 1, wherein said copolymerizing comprises:
copolymerizing propylene and a small amount of an α-olefin and then further copolymerizing with an additional amount of an α-olefin.

10. The method according to claim 9, wherein said α-olefin is ethylene.

11. The method according to claim 10, further comprising copolymerizing with at least one α-olefin other than said propylene and ethylene.

12. The method according to claim 11, wherein said at least one α-olefin other than said propylene and ethylene is 1-butene.

* * * * *